(12) United States Patent
Kelly et al.

(10) Patent No.: US 8,296,380 B1
(45) Date of Patent: Oct. 23, 2012

(54) SOCIAL MEDIA BASED MESSAGING SYSTEMS AND METHODS

(75) Inventors: Kel Kelly, Hopkinton, MA (US); Michael Joseph Witwicki, Danvers, MA (US)

(73) Assignee: Kel & Partners LLC, Boston, MA (US)

( * ) Notice: Subject to any disclaimer, the term of this patent is extended or adjusted under 35 U.S.C. 154(b) by 41 days.

(21) Appl. No.: 12/752,750

(22) Filed: Apr. 1, 2010

(51) Int. Cl.
- G06F 15/16 (2006.01)
- G06F 15/173 (2006.01)
- G06F 15/177 (2006.01)

(52) U.S. Cl. .............. 709/206; 709/224; 726/5; 726/7; 715/205; 703/23; 707/780

(58) Field of Classification Search .............. 709/206, 709/203, 217–228; 726/5, 7; 715/205; 703/23; 707/780
See application file for complete search history.

(56) References Cited

U.S. PATENT DOCUMENTS

| | | | |
|---|---|---|---|
| 2009/0037452 A1* | 2/2009 | Baitalmal et al. | 707/101 |
| 2009/0313684 A1* | 12/2009 | Shah et al. | 726/7 |
| 2010/0199338 A1* | 8/2010 | Craddock et al. | 726/7 |
| 2010/0268524 A1* | 10/2010 | Nath et al. | 703/23 |
| 2010/0313250 A1* | 12/2010 | Chow | 726/5 |
| 2010/0332961 A1* | 12/2010 | Ramaswamy | 715/205 |
| 2011/0047182 A1* | 2/2011 | Shepherd et al. | 707/780 |
| 2011/0078306 A1* | 3/2011 | Krishnamurthy | 709/224 |
| 2011/0154370 A1* | 6/2011 | Yu | 719/318 |
| 2011/0161444 A1* | 6/2011 | Chauhan | 709/206 |
| 2011/0197237 A1* | 8/2011 | Turner | 725/78 |

* cited by examiner

*Primary Examiner* — Haresh N Patel
(74) *Attorney, Agent, or Firm* — Onello & Mello LLP

(57) ABSTRACT

A method of message distribution, the method performed in a computer system having one or more processors accessing one or more databases comprising user account records, the one or more databases being stored in at least one storage device accessible by the one or more processors, the method including receiving a first message from a sender of a first client system, retrieving a first user credential of a first social media user account and a second user credential of a second social media user account stored in the one or more databases, packaging the first message and the first user credential into a first message package and the first message and the second user credential into a second message package, transmitting the first message package to a first social media system, the first social media system automatically distributing the first message to predetermined recipients of the first social media user account, and transmitting the second message package to the first social media system, the first social media system automatically distributing the first message to predetermined recipients of the second social media user account.

29 Claims, 23 Drawing Sheets

| # | Username | Password | System ID | Company ID | Group ID |
|---|---|---|---|---|---|
| 1 | User 1 | P1 | T | A | 1 |
| 2 | User 2 | P2 | F | A | 2 |
| 3 | User 3 | P3 | T | A | 1, 4 |
| ... | ... | ... | ... | ... | ... |
| n-1 | User n-1 | Pn-1 | T | A | 1, 3 |
| n | User n | Pn | F/J | A | 2, 3 |

FIG. 9E

SOCIAL MEDIA BASED MESSAGING SYSTEMS AND METHODS

TECHNICAL FIELD

The present inventive concepts generally relate to electronic messaging systems and methods, and more particularly, to distributed, multi-account, social media messaging systems and methods of distributing electronic messages through multiple social media user accounts.

BACKGROUND

Social media systems are generally designed to be highly accessible web-based systems, which can be configured to dynamically deliver or serve user-generated content, such as user profiles and user postings, to client systems. Such conventional social media systems allow for the creation and exchange of user-generated content, and are often referred to as Web 2.0 application systems.

Presently, social media systems can take the form of Blogs (B), Micro-Blogs (μB) and Social Networks (SN). Blogs and Micro-Blogs typically consist of individual web-accessible user profiles in which individual account holders can publish content, such as text, pictures, video and audio. In addition, some Blogs and Micro-Blogs allow individual account holders to push content to their friends and followers to view. The content published to Micro-Blogs differs from Blogs in that the user-content published to Micro-Blogs generally comprises short messages and HTML links to camera phone pictures, videos, and/or audio clips. On the other hand, Social Networks typically consist of individual web-accessible user profiles that can be associated with other user profiles of a common location, work place or college, and in some instances, Social Networks allow for two-way exchange of content. Common social media systems in use today include Blogging platforms, such as, WordPress, Typepad and Blogger, Micro-Blogs, such as, Twitter and Jaiku, and Social Networks, such as, Facebook and MySpace.

Currently, social media systems comprise a plurality of individual user accounts, which, for the purpose of publishing user-content, are each accessible in response to a corresponding user name and password. Accordingly, such conventional social media systems provide a publishing and delivery platform for individual users to publish and broadcast their user-content to numerous recipients, referred to, for example, as "friends" or "followers". These types of publishing and broadcasting platforms in which user-content from one sender is published and broadcast to many receivers or recipients are, in some instances, referred to as one-to-many type communication systems.

SUMMARY

Embodiments of the present inventive concepts are directed to distributed, multi-account, social media messaging systems and methods of distributing electronic messages through multiple social media user accounts. In one aspect, embodiments provide systems and methods of content distribution that realize, among other features, a platform for the distribution of electronic content through multiple user-accounts of one or more social media systems, while allowing individual user-account holders to continue to create and publish their own user-generated content. Embodiments are applicable to social media systems such as Blogs, Micro-Blogs and Social Networks, as well as other types of social media systems.

In one aspect, a method of message distribution is performed in a computer system having one or more processors accessing one or more databases comprising user account records, the one or more databases being stored in at least one storage device accessible by the one or more processors, the method comprising: receiving a first message from a sender of a first client system; retrieving a first user credential of a first social media user account and a second user credential of a second social media user account stored in the one or more databases; packaging the first message and the first user credential into a first message package and the first message and the second user credential into a second message package; transmitting the first message package to a first social media system, the first social media system automatically distributing the first message to predetermined recipients of the first social media user account; and transmitting the second message package to the first social media system, the first social media system automatically distributing the first message to predetermined recipients of the second social media user account.

In one embodiment, the method further comprises retrieving a third user credential of a third social media user account stored in the one or more databases; packaging the first message and the third user credential into a third message package; and transmitting the third message package to a second social media system, the second social media system automatically distributing the first message to predetermined recipients of the third social media user account.

In another embodiment, the second social media system is configured as a different social media service than that of the first social media system.

In another embodiment the second social media system is configured as Jaiku® social media service.

In another embodiment, the first social media system is configured as a social media service selected from the group of social media services consisting of: Jaiku®, Plurk, Tumblr, Posterous, Yammer, FMyLife, Bebo, BigTent, Elgg, Facebook®, Geni.com, Hi5, LinkedIn®, MySpace®, Ning, Orkut, Skyrock, Qzone, Vkontakte, RenRen, Kaixin, ASmallWorld, studivz, Xing, Blogger, LiveJournal, Open Diary, TypePad, WordPress, Vox, ExpressionEngine and Xanga.

In another embodiment, the second social media system is configured as a social media service selected from the group of social media services consisting of: Plurk, Tumblr, Posterous, Yammer, FMyLife, Bebo, BigTent, Elgg, Facebook®, Geni.com, Hi5, LinkedIn®, MySpace®, Ning, Orkut, Skyrock, Qzone, Vkontakte, RenRen, Kaixin, ASmallWorld, studivz, Xing, Blogger, LiveJournal, Open Diary, TypePad, WordPress, Vox, ExpressionEngine and Xanga.

In another embodiment, the first message comprises a user-accessible text string that is limited in number of characters.

In another embodiment, the user-accessible text string is limited in number of characters by the first social media system.

In another embodiment, the user-accessible text string is limited to 140 characters or less. In another embodiment, the first message consists essentially of a text string having 140 characters or less.

In another embodiment, the first user credential comprises a first username and a first password, and wherein the second user credential comprises a second username and a second password.

In another embodiment, packaging the first message and the first user credential further comprises concatenating an API URL of the first social media system with the first message, the result of the concatenation being stored in a first standard class variable of a cURL library function; and concatenating the first user name with the first password, the result of the concatenation being stored in a second class variable of cURL library function.

In another embodiment, transmitting the first message package further comprises executing a cURL session with the first social media system.

In another embodiment, the first user credential comprises a first authentication token, and the second user credential comprises a second authentication token.

In another embodiment, packaging the first message and the first user credential further comprises concatenating an API URL of the first social media system with the first message, the result of the concatenation being stored in a first standard class variable of a cURL library function; and storing the first authentication token in a second class variable of cURL library function.

In another embodiment, the first standard class variable is a CURLOPT_URL variable and the second standard class variable is a CURLOPT_USERPWD variable.

In another embodiment, the method further comprises receiving a first group selection from the sender of the first client system, the first group selection identifying a predetermined group of social media user accounts through which the first message is transmitted, wherein the first group identifies the first social media user account and the second social media user account stored in the one or more databases.

In another embodiment, the computer system comprises a distributed social media messaging system configured with a LAMP solution stack and a content management system.

In another embodiment, the content management system comprises an ExpressionEngine® content management system.

In another embodiment, the first social media system is configured as a micro-blogging service.

In another embodiment, the first social media system is configured as Twitter® micro-blogging service.

In another embodiment, the method further comprises logging into a web-based user interface hosted by the first social media system, via a second client system, using the first user credential; and submitting a second message to the first social media system via the second client system, wherein the first social media system automatically distributes the second message to the predetermined recipients of the first social media user account.

In another embodiment, the second message comprises a user-accessible text string that is limited in number of characters.

In another embodiment, the user-accessible text string is limited in number of characters by the second social media system.

In another embodiment, the user-accessible text string is limited to 140 characters or less.

In another embodiment, the second message consists essentially of a text string having 140 characters or less.

In another aspect, in a multi-tiered social networking environment comprising a sender, at least one sender/receiver and a plurality of recipients, each recipient of the plurality of recipients being a predetermined recipient of messages from the at least one sender/receiver, a method of distributing messages comprises: transmitting a first message package through a first internet communication stream to a first sender/receiver, the first sender/receiver automatically distributing a first message of the first message package to each predetermined recipient of the first sender/receiver; and transmitting a second message package through a second internet communication stream to a second sender/receiver, the second sender/receiver automatically distributing a second message of the second message package to each predetermined recipient of the second sender/receiver.

In one embodiment, the first message of the first message package consists essentially of a text string having 140 characters or less, and the second message of the second message package consists essentially of a text string having 140 characters of less.

In another embodiment, the text string of the first message and the text string of the second message are the same.

In another embodiment, the first message package further comprises user credentials of the first sender/receiver, and the second message package further comprises user credentials of the second sender/receiver.

In another embodiment, the method further comprises receiving a client message from a client system; packaging the client message received from the client system and the user credentials of the first sender/receiver into the first message package, wherein the first message of the first message package corresponds to the client message from the client system; and packaging the client message received from the client system and the user credentials of the second sender/receiver into the second message package, wherein the second message of the second message package corresponds to the client message from the client system.

In another embodiment, transmitting the first message package to the first sender/receiver comprises executing a cURL session with a first social media system having a first user account corresponding to the user credentials of the first sender/receiver, and transmitting the second message package to the second sender/receiver comprises executing a cURL session with the first social media system having a second user account corresponding to the user credentials of the second sender/receiver.

In another aspect, a distributed social media messaging system comprises at least one storage device; and at least one storage device; and at least one processor connected to the at least one storage device, the at least one processor configured to execute a unique set of instructions stored in the at least one storage device, the unique set of instructions configuring the distributed social media messaging system to receive a first message from a sender of a first client system; retrieve a first user credential of a first social media user account and a second user credential of a second social media user account stored in one or more databases; package the first message and the first user credential into a first message package and the first message and the second user credential into a second message package; transmit the first message package to a first social media system, wherein the first social media system automatically distributes the first message to predetermined recipients of the first social media user account; and transmit the second message package to the first social media system, wherein the first social media system automatically distributes the first message to predetermined recipients of the second social media user account.

In one embodiment, the at least one processor is further configured to retrieve a third user credential of a third social media user account stored in the one or more databases; package the first message and the third user credential into a third message package; and transmit the third message package to a second social media system, the second social media system automatically distributing the first message to predetermined recipients of the third social media user account.

In another embodiment, the second social media system is configured as a different social media service than that of the first social media system.

In another embodiment, the second social media system is configured as Jaiku® social media service.

In another embodiment, the second social media system is configured as a social media service selected from the group of social media services consisting of: Plurk, Tumblr, Posterous, Yammer, FMyLife, Bebo, BigTent, Elgg, Facebook®, Geni.com, Hi5, LinkedIn®, MySpace®, Ning, Orkut, Skyrock, Qzone, Vkontakte, RenRen, Kaixin, ASmallWorld, studivz, Xing, Blogger, LiveJournal, Open Diary, TypePad, WordPress, Vox, ExpressionEngine and Xanga.

In another embodiment, the first message comprises a user-accessible text string that is limited in number of characters.

In another embodiment, the user-accessible text string is limited in number of characters by the first social media system.

In another embodiment, the user-accessible text string is limited to 140 characters or less.

In another embodiment, the first message consists essentially of a text string having 140 characters or less.

In another embodiment, the first user credential comprises a first username and a first password, and wherein the second user credential comprises a second username and a second password.

In another embodiment, the at least one processor is further configured to concatenate an API URL of the first social media system with the first message, the result of the concatenation being stored in a first standard class variable of a cURL library function; and concatenate the first user name with the first password, the result of the concatenation being stored in a second class variable of cURL library function, when packaging the first message and the first user credential.

In another embodiment, the at least one processor is further configured to execute a cURL session with the first social media system, when transmitting the first message package.

In another embodiment, the first user credential comprises a first authentication token, and wherein the second user credential comprises a second authentication token.

In another embodiment, the at least one processor is further configured to concatenate an API URL of the first social media system with the first message, the result of the concatenation being stored in a first standard class variable of a cURL library function and store the first authentication token in a second class variable of cURL library function, when packaging the first message and the first user credential.

In another embodiment, the first standard class variable is a CURLOPT_URL variable and wherein the second standard class variable is a CURLOPT_USERPWD variable.

In another embodiment, the at least one processor is further configured to receive a first group selection from the sender of the first client system, the first group selection identifying a predetermined group of social media user accounts through which the first message is transmitted, wherein the first group identifies the first social media user account and the second social media user account stored in the one or more databases.

In another embodiment, the distributed social media messaging system is further configured with a LAMP solution stack and a content management system.

In another embodiment, the content management system comprises an ExpressionEngine® content management system.

In another embodiment, the first social media system is configured as Twitter® micro-blogging service.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 9E illustrates an example embodiment of a database record table comprising a plurality of social media system user account credentials in accordance with embodiments of the present inventive concepts.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Figure 1:
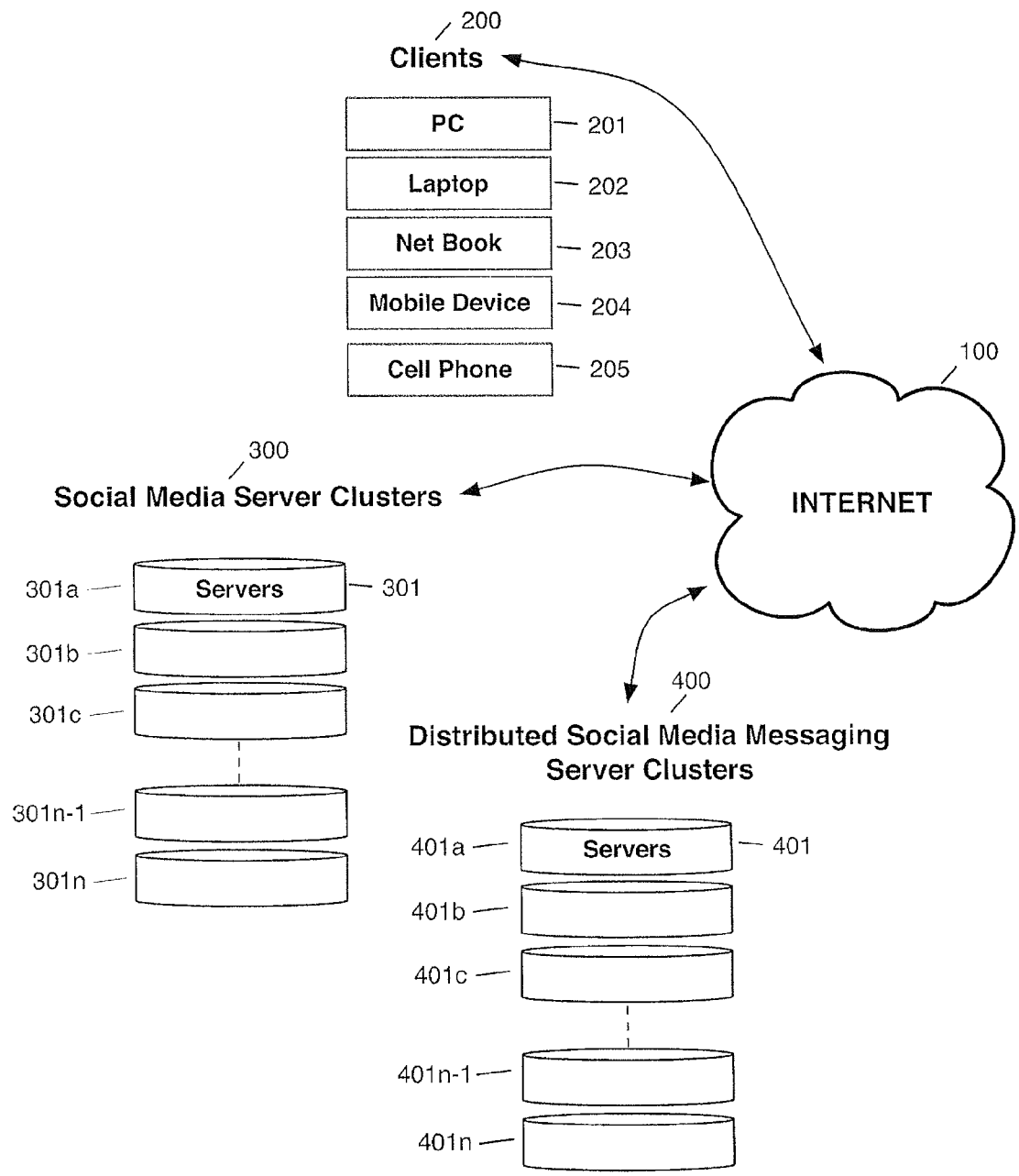
FIG. 1 is an architectural view of a distributed social media messaging system having communication streams with social media systems and clients in accordance with embodiments of the present inventive concepts.

FIG. 1 is an architectural view of a distributed social media messaging system having communication streams with social media systems and clients in accordance with embodiments of the present inventive concepts.

The Internet 100 is a global hardware and software infrastructure that comprises private and public computer systems and networks that operate according to the Transmission Control Protocol (TCP) and Internet Protocol (IP) communication standards. The Internet 100 is designed to receive, transmit and route electronic information or data between computer systems and networks located around the world.

In this exemplary embodiment, clients 200, social media systems 300 and distributed social media messaging systems 400 are each connected to the Internet 100. As such, the clients 200, the social media systems 300 and the distributed social media messaging systems 400 can communicate, receive and transmit data, through the Internet 100 with each other.

The client systems 200 can comprise communication devices and workstations that include, for example, personal computers (PC) 201, laptop computers 202, netbook computers 203, mobile devices 204 and cell phones 205. For example, a personal computer such as an Inspiron Desktop, a laptop such as an Inspiron Laptop, or a netbook such as Mini 10, each by Dell Inc. of Round Rock, Tex., USA, can be used to access computers, servers and networks connected to the Internet 100. In addition, mobile devices such as personal digital assistants (PDAs) and smartphones, such as the iPhone by Apple of Cupertino, Calif., USA, can be used to access computers, servers and networks connected to the Internet 100. Likewise, cell phones with mobile web integration, such as cell phones with WAP browsers, can also access computers, servers and networks connected to the Internet 100.

The social media systems 300 can comprise an individual server 301 or a cluster of servers 301a, 301b, 301c, . . . , 301n-1, 301n configured as a Blog server, Micro-Blog server, Social Network server, or combination thereof. Social media systems 300 can be further configured to dynamically deliver or serve user-generated content, typically in the form of web-accessible content, to a plurality of client systems 200.

The distributed social media messaging systems 400 can comprise an individual server 401 or a cluster of servers 401a, 401b, 401c, . . . , 401n-1, 401n configured to distribute electronic messages through multiple user-accounts of one or more social media systems 300. In one embodiment, the electronic messages can comprise text, such as ASCII or UTF-8 text, pictures, video and/or audio.

Figure 2A:
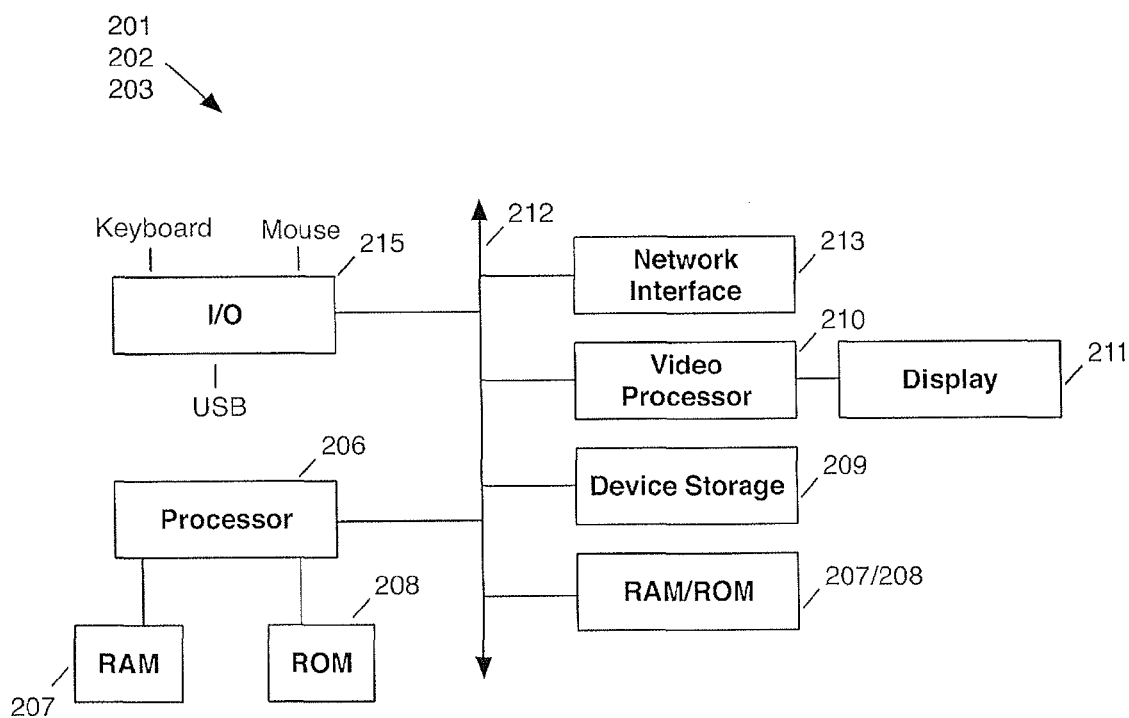
FIG. 2A is a block diagram of an example embodiment of a client system in accordance with embodiments of the present inventive concepts.

FIG. 2A is a block diagram of an example embodiment of a client system in accordance with embodiments of the present inventive concepts. A client system 200, such as a PC 201, laptop 202 or netbook 203, can comprise a processor 206, for example, a central processing unit (CPU)), random access memory (RAM) 207, read only memory (ROM) 208 (i.e., non-volatile memory), device storage 209, for example, disk drives (DD), hard drives (HD) and solid-state drives (SSD)), a video processor 210, a display 211, a network interface 213 and an I/O device 215.

In some embodiments, the processor 206 can comprise RAM, ROM and/or flash memory, and in other embodiments, RAM, ROM and/or flash memory can be directly connected to the processor 206 and/or connected to the processor 206 via a system bus 212. The processor 206 executes a unique set of instructions stored in at least one of the RAM 207, ROM 208, device storage 209 or flash memory, such that the client system 200 is configured into a special purpose system.

A display device 211 (e.g., CRT, LED, LCD, TFT, OLED, Plasma) can be connected to the processor via a video processor 210. In some embodiments, the video processor 210 can comprise a video processing chip set or a graphics card. The display device 211, in conjunction with other components of the client systems 200, can operate to display user-generated content of social media systems 300 (see for example, FIG. 9F), such as Blogs, Micro-Blogs and Social Networks, and can further operate to display web-based content of distributed social media messaging systems 400 (see for example, FIGS. 9A-9D).

A network interface 213 can be connected to the processor 206 via the system bus 213. The network interface 213 can comprise a network interface controller (NIC) or wireless local area network controller (WLAN). In one embodiment, the network interface 213 is connected to the Internet 100, which provides the client systems 200 with communication links to social media systems 300 and distributed social media messaging systems 400.

An I/O device can be further connected to the processor 206 via the system bus 212. The I/O device can provide a link between the client system 200 and external devices, such as, USB devices, keyboard devices, and computer mice.

Figure 2B:
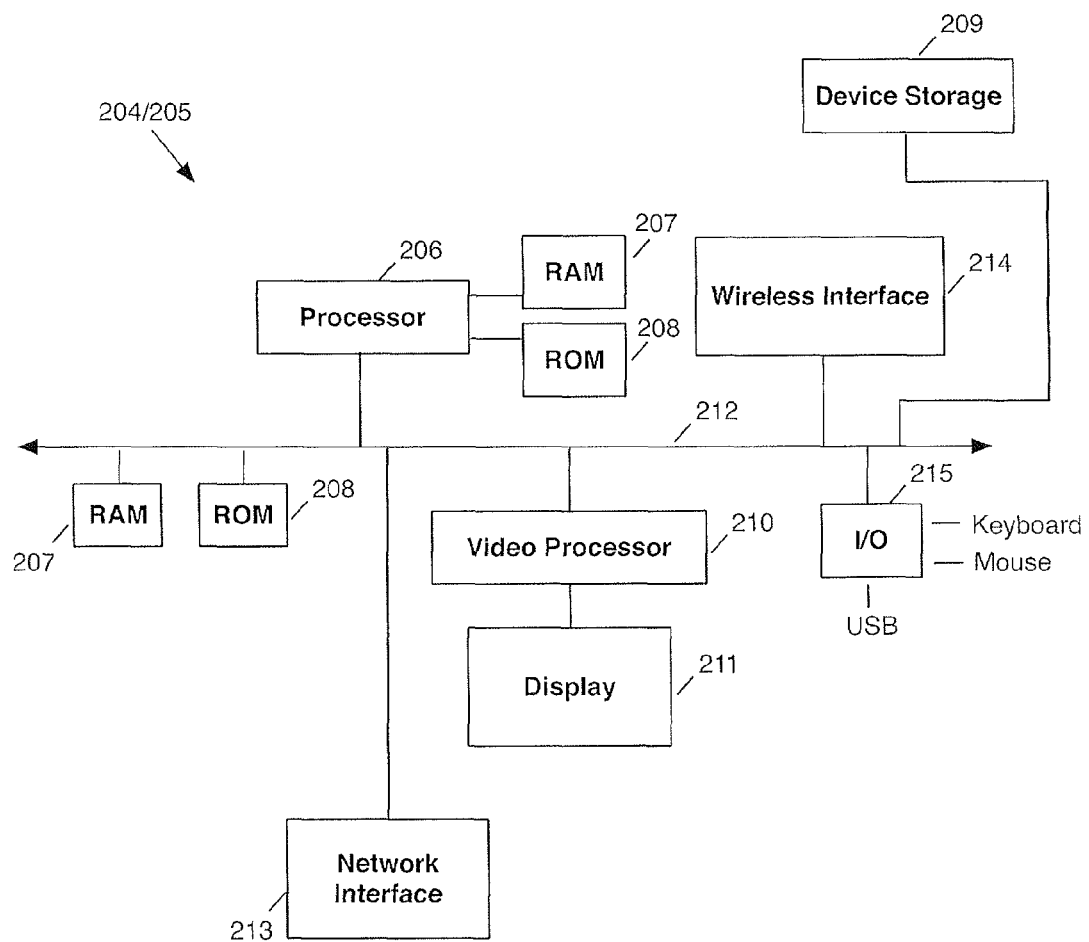
FIG. 2B is a block diagram of an example embodiment of a client system in accordance with embodiments of the present inventive concepts.

FIG. 2B is a block diagram of an example embodiment of a client system in accordance with embodiments of the present inventive concepts. Elements having the same functions as those illustrated in FIG. 2A are indicated by like reference identifiers, and thus their detailed description will be omitted.

A client system 200, such as a mobile device 204 or a cell phone 205, can comprise a processor 206, for example, a microprocessor (μP), a digital signal processor (DSP) or a programmable logic device (PLD)), random access memory (RAM) 207, read only memory (ROM) 208, device storage 209, for example, DD, HD, SSD or flash memory, a video processor 210, a display 211, a network interface 213, a wireless interface 214 and an I/O device 215.

A wireless interface 214 can be connected to the processor 206 via the system bus 212, which, in one embodiment, can provide a radio communication link to cellular networks. The wireless interface 214 can comprise a radio transceiver that operates according to one of the following multiplexing schemes: frequency division multiplex (FDM), time division multiplex (TDM), code division multiplex (CDM), and space division multiplex (SDM). Corresponding to these multiplexing schemes are the following access techniques: frequency division multiple access (FDMA), time division multiple access (TDMA), code division multiple access (CDMA), and space division multiple access (SDMA).

The processor 206 executes a unique set of instructions stored in at least one of the RAM 207, ROM 208, device storage 209 or flash memory, such that the client system 200 is configured into a special purpose system.

Figure 3A:
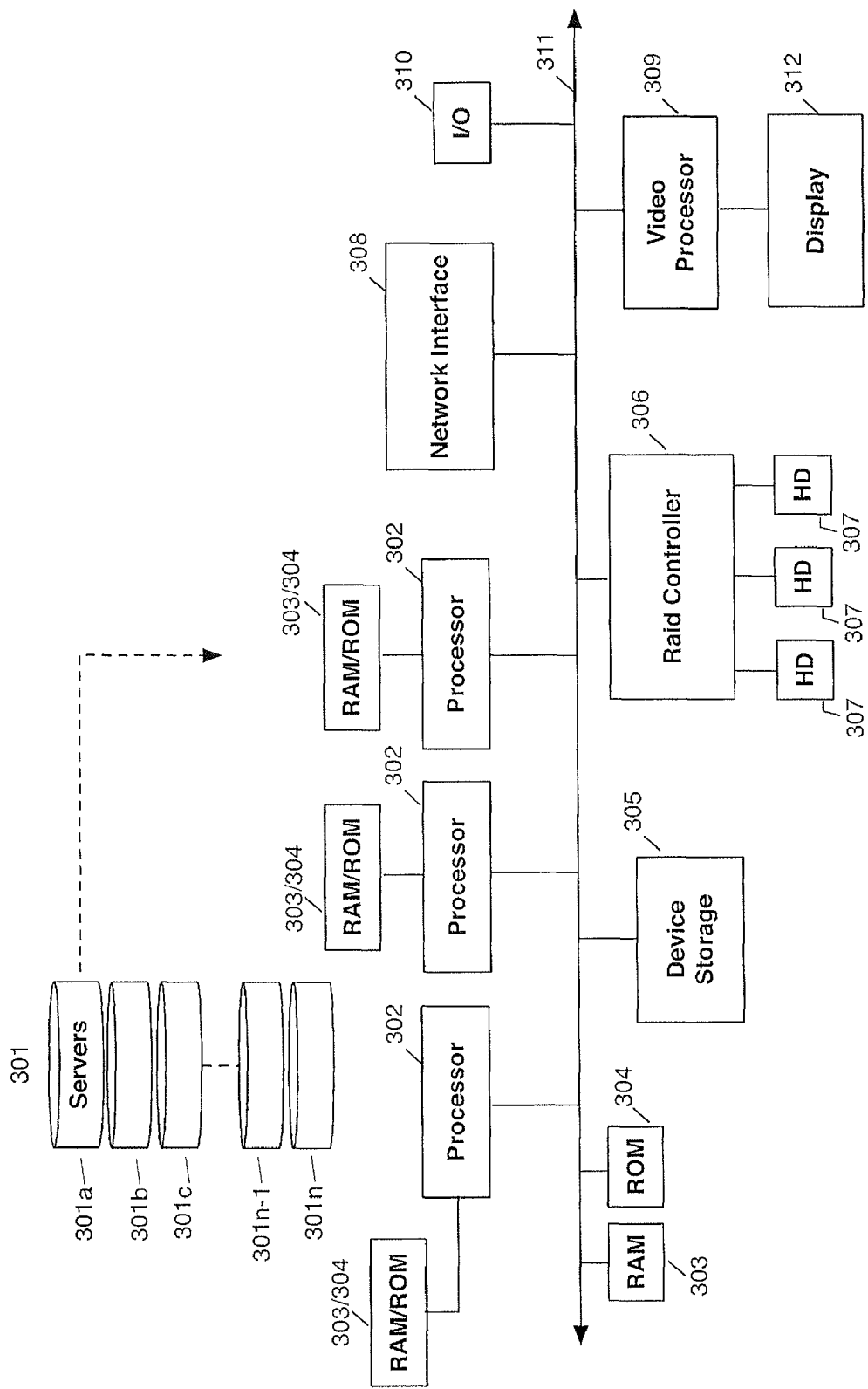
FIG. 3A is a block diagram of an example embodiment of a social media server system in accordance with embodiments of the present inventive concepts.

FIG. 3A is a block diagram of an example embodiment of a social media server system in accordance with embodiments of the present inventive concepts. A social media server 301 can comprise one or more processors 302, for example, central processing units (CPU), RAM 303, ROM 304, device storage 305, for example, DD, HD, SSD, a RAID controller 306 having at least two hard drives 307 or SSDs connected thereto, a network interface 308, a video processor 309, an I/O device 310 and a display device 312.

The network interface 308 can be connected to one or more of the processors 302 via the system bus 311. The network interface 308 can comprise for example, a NIC or WLAN. In one embodiment, the network interface 308 is connected to the Internet 100, which provides the social media server 301 with a communication link between client systems 200 and distributed social media messaging systems 400.

One or more of the processors 302 execute a unique set of instructions stored in at least one of the RAM 303, ROM 304, device storage 305 or hard drives 307, such that the social media server 301 is configured into a special purpose system.

Figure 3B:
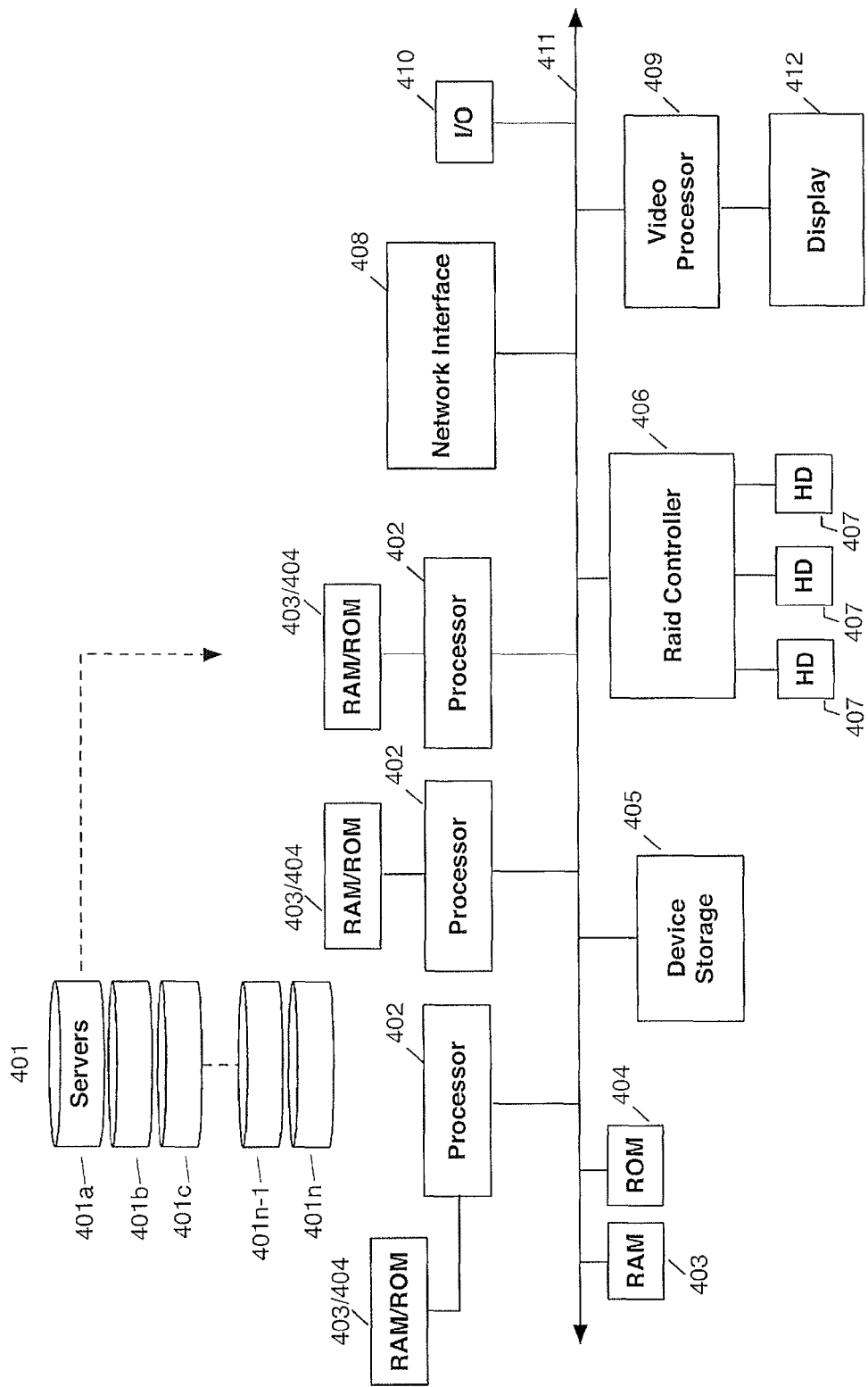
FIG. 3B is a block diagram of an example embodiment of a distributed social media messaging system in accordance with embodiments of the present inventive concepts.

FIG. 3B is a block diagram of an example embodiment of a distributed social media messaging system in accordance with embodiments of the present inventive concepts. A distributed social media messaging server 401 can comprise one or more processors 402, for example, central processing units (CPU)), RAM 403, ROM 404, device storage 405, for example, DD, HD, SSD, a RAID controller 406 having at least two hard drives 407 or SSDs connected thereto, a network interface 408, a video processor 409, an I/O device 410 and a display device 412.

The network interface 408 can be connected to one or more of the processors 402 via the system bus 411. The network interface 408 can comprise a NIC or WLAN. In one embodiment, the network interface 408 is connected to the Internet 100, which provides the distributed social media messaging server 401 with a communication link between client systems 200 and social media systems 300.

One or more of the processors 402 execute a unique set of instructions stored in at least one of the RAM 403, ROM 404, device storage 405 or hard drives 407, such that the distributed social media messaging server 401 is configured into a special purpose system.

Figure 4:
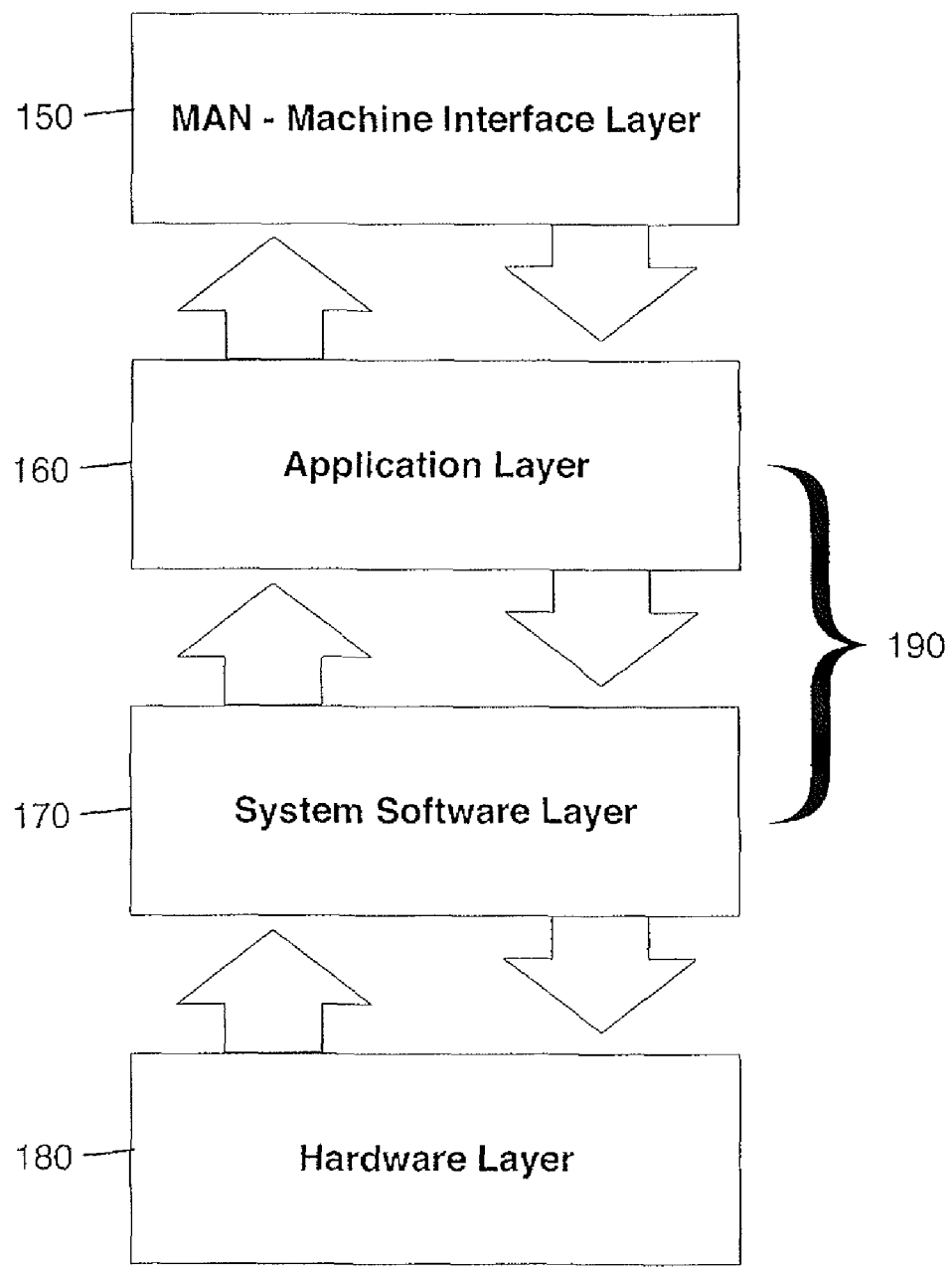
FIG. 4 is a block diagram illustrating hardware and software layers of a distributed social media messaging system in accordance with embodiments of the present inventive concepts.

FIG. 4 is a block diagram illustrating hardware and software layers of a distributed social media messaging system in accordance with embodiments of the present inventive concepts. A distributed social media messaging system 400 can comprise a computer hardware layer 180, which includes electronic components having physical interconnections required to execute a unique set of instructions stored in system memory. At the lowest level of abstraction, executable instruction sets comprise machine code, which are executed on the hardware layer 180, typically, by one or more processors 402 (see FIG. 3B). As such, the combination of computer hardware and executable instruction sets can transform a general purpose computer or server into a particular, special purpose system.

A system software layer 170, which, in one embodiment, can comprise firmware, device drivers and an operating system, configures the hardware layer 180 to allow direct user interaction through I/O devices and/or indirect user interaction through client systems 200.

An application layer 160, which, in one embodiment, can comprise database management systems, web application services, and content management systems, allows the passing of instructions from the application layer 160 to the system software layer 170, and further allows the passing of instructions from the system software layer 170 to the hardware layer 180, which ultimately receives and executes the instructions.

A man-machine interface layer 150 typically comprises at least one of: a graphical user interface (GUI), a web user interface (WUI), a touch user interface, or a combination thereof, to facilitate interactions between humans and machines (e.g., computers, servers, clients). In some instances, a GUI or WUI is hosted and served by the social media system 300 and/or the distributed social media messaging system 400, such that client systems 200 and their corresponding users can interact directly with the systems 300, 400 and/or indirectly with the systems 300, 400 through communication streams over the Internet 100.

In one embodiment, the distributed social media messaging system 400 is configured with a solution stack 190, such as a LAMP solution stack (i.e., Linux operating system, Apache web server, MySQL database software, and PHP, Phython or Perl scripting languages), a WAMP solution stack (i.e., Microsoft Windows operating system, Apache web server, MySQL database software, and PHP, Phython or Perl scripting languages) or a MAMP solution stack (i.e., Mac operating system, Apache web server, MySQL database software, and PHP, Phython or Perl scripting languages).

Figure 5A:
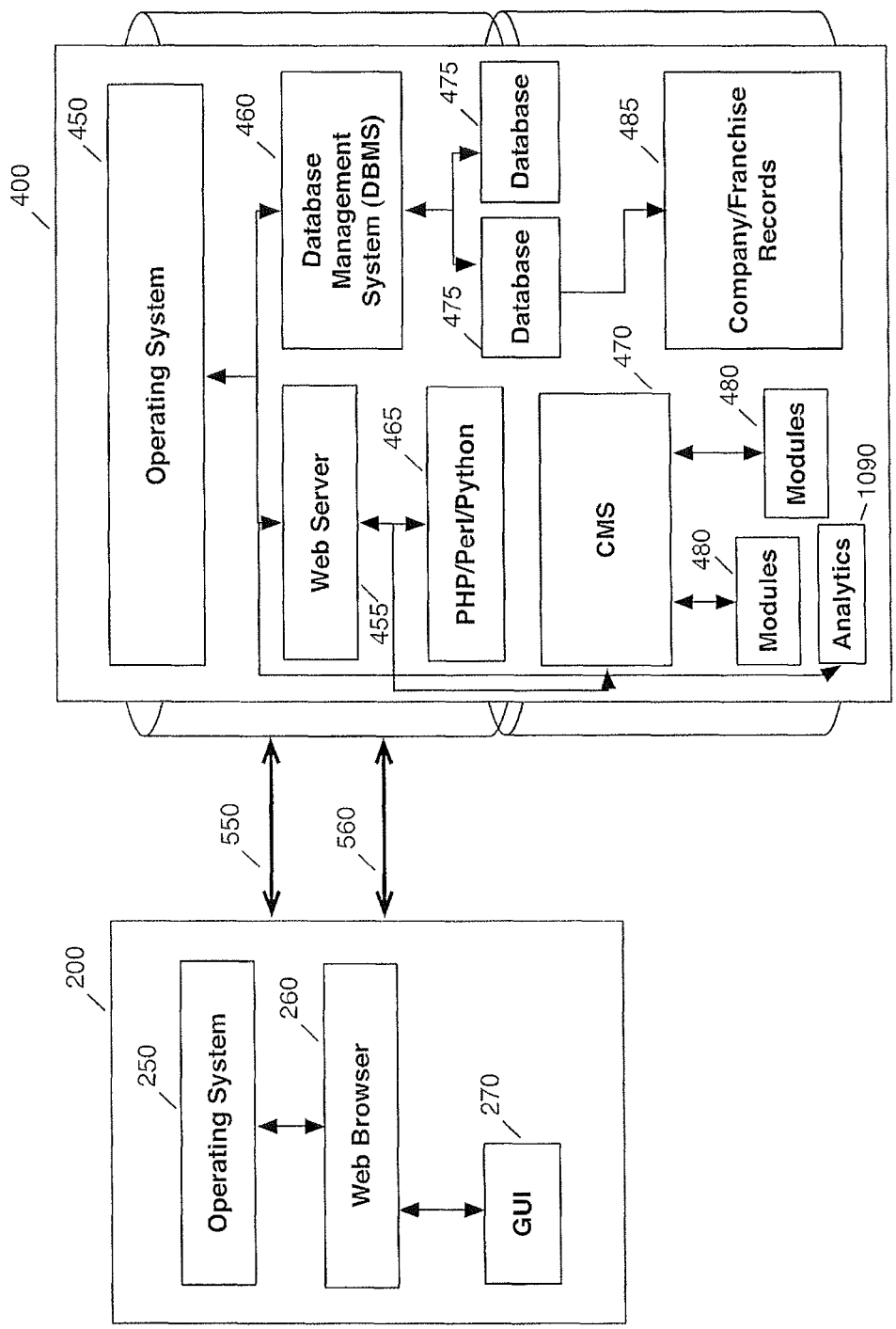
FIG. 5A is a block diagram illustrating electronic communication streams between a distributed social media messaging system and a client system in accordance with embodiments of the present inventive concepts.

FIG. 5A is a block diagram illustrating electronic communication streams between a distributed social media messaging system and a client system in accordance with embodiments of the present inventive concepts. In one embodiment, the client system 200 can be configured with an operating system 250, such as, Microsoft Windows, Mac OS, Windows Mobile, iPhone OS, Palm OS and the like, and a web browser 260, such as, Microsoft Internet Explorer, Apple Safari and the like, which displays graphical content via a GUI 270.

The client systems 200 can communicate, transfer and receive data, with the distributed social media messaging system 400 through internet communication streams, such as, a Hypertext transfer protocol (HTTP/HTTPS) stream 550 or other protocol streams 560 (e.g., SSH, telnet, SMTP, SMS, MMS).

In one embodiment, the distributed social media messaging system 400 can be configured with a solution stack comprising an operating system 450, a web server 455, a database management system (DBMS) 460 and scripting languages 465. For example, the distributed social media messaging system 400 can be configured with a LAMP, WAMP or MAMP solution stack.

The distributed social media messaging system 400 can further be configured with a content management system (CMS) 470 having one or more modules 480. The CMS 470 can comprise a web content management system (WCMS), which is a web based application for creating and managing web-content, such as, HTML, XHTML, and the like. In one embodiment, the CMS 470 comprises an ExpressionEngine® content management system by EllisLab, Inc. of Bend, Oreg., USA. Furthermore, as will be appreciated by those skilled in the art, at least portions of the systems and methods disclosed in FIGS. 6-8 herein can be embodied in modules 480 comprising a unique set of executable instructions.

The distributed social media messaging system 400 can further be configured with a DBMS 460 having one or more databases 475. At least one of the databases 475 can comprise company/franchise records 485, such as, the table of records illustrated in FIG. 9E.

The distributed social media messaging system 400 can further be configured with an analytic system 1090 for tracking, analyzing and optimizing messages distributed by the social media system 400. The analytic system 1090 can comprise a Radian6 analytic system by Radian6 Technologies Inc, of 30 Knowledge Park Drive, 2nd Floor, Fredericton, NB, E3C 2R2, a Sysomos Business Intelligence system by Sysomos Inc. of 326 Adelaide Street West, Suite 600, Toronto, ON, M5V 1R3, Canada, and/or a Scout Labs analytic system by Scout Labs of 199 Fremont 12th Floor, San Francisco, Calif. 94105. Further, the analytic system 1090 can comprise other tracking, analyzing and optimization systems similar to those listed above.

Figure 5B:
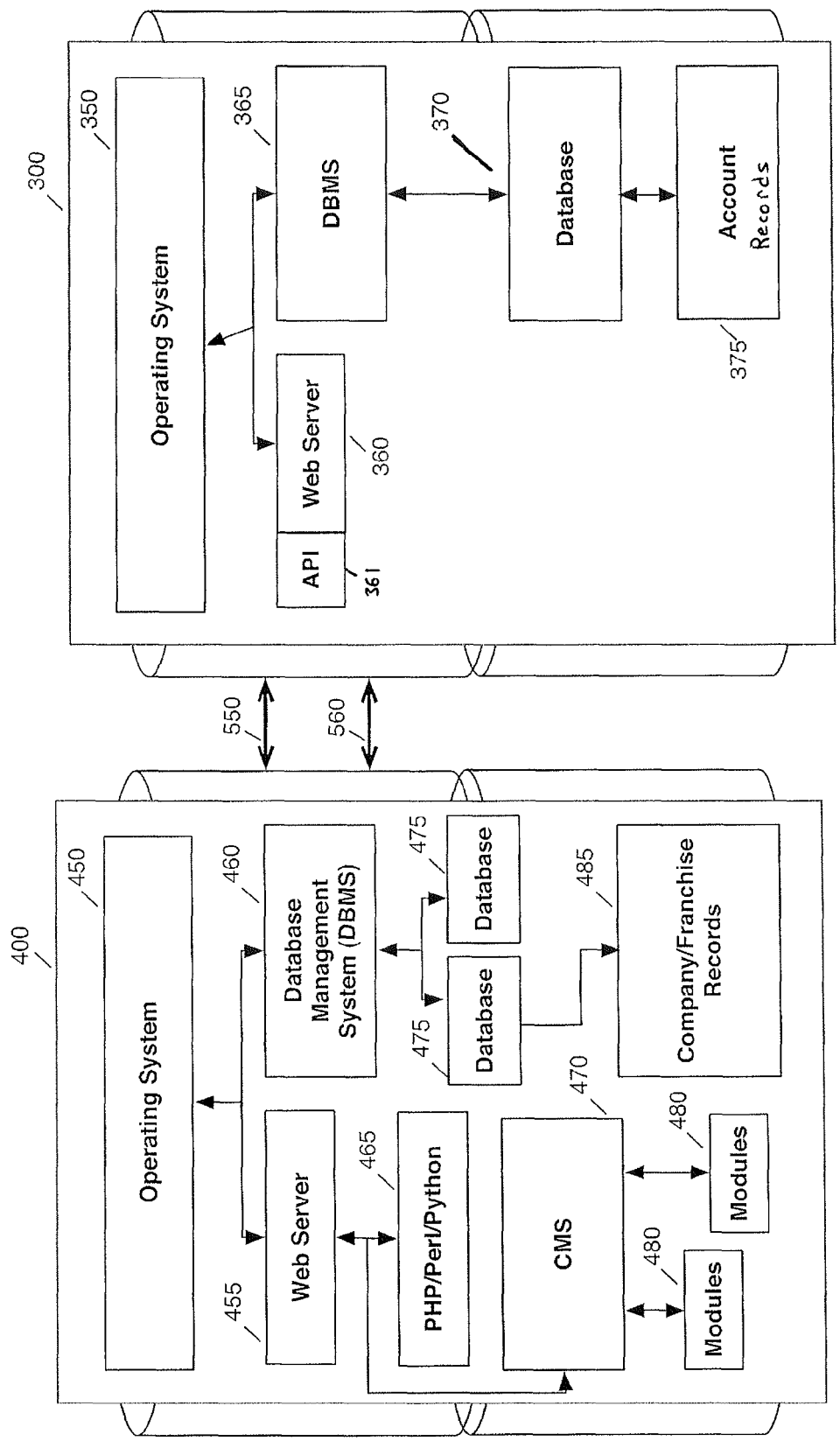
FIG. 5B is a block diagram illustrating electronic communication streams between a distributed social media messaging system and a social media system in accordance with embodiments of the present inventive concepts.

FIG. 5B is a block diagram illustrating electronic communication streams between a distributed social media messaging system and a social media system in accordance with embodiments of the present inventive concepts.

In one embodiment, the social media system 300 can be configured with a solution stack comprising an operating system 350, a web server 360 having an open application programming interface (API) 361 and a database management system (DBMS) 365 having at least one database 370. The at least one database 370 can comprise social media account records 375, such as, account names, usernames, passwords, account profiles and account settings.

The social media system 300 can be configured as a Blog server, Micro-Blog server, Social Network server, or combination thereof. In one embodiment, the social media system 300 is configured as a Twitter® micro-blogging service. In another embodiment, the social media system 300 is configured as a Facebook® social network service. In another embodiment, the social media system 300 is configured as a LinkedIn® business-oriented social networking service. Further, in other embodiments, the social media system 300 can be configured as a social media service selected from the group of social media services consisting of: Jaiku, Plurk, Tumblr, Posterous, Yammer, FMyLife, Bebo, BigTent, Elgg, Geni.com, Hi5, MySpace, Ning, Orkut, Skyrock, Qzone, Vkontakte, RenRen, Kaixin, ASmallWorld, studivz, Xing, Blogger, LiveJournal, Open Diary, TypePad, WordPress, Vox, ExpressionEngine and Xanga.

The distributed social media messaging system 400 can communicate, transfer and receive data, with the social media system 300 through internet communication streams, such as, a Hypertext transfer protocol (HTTP/HTTPS) 550 or other protocol streams 560 (e.g., SSH, telnet, SMTP, SMS, MMS). In one embodiment, the distributed social media messaging system 400 communicates through the open application programming interface (API) 361 of the social media system 300.

Figure 5C:
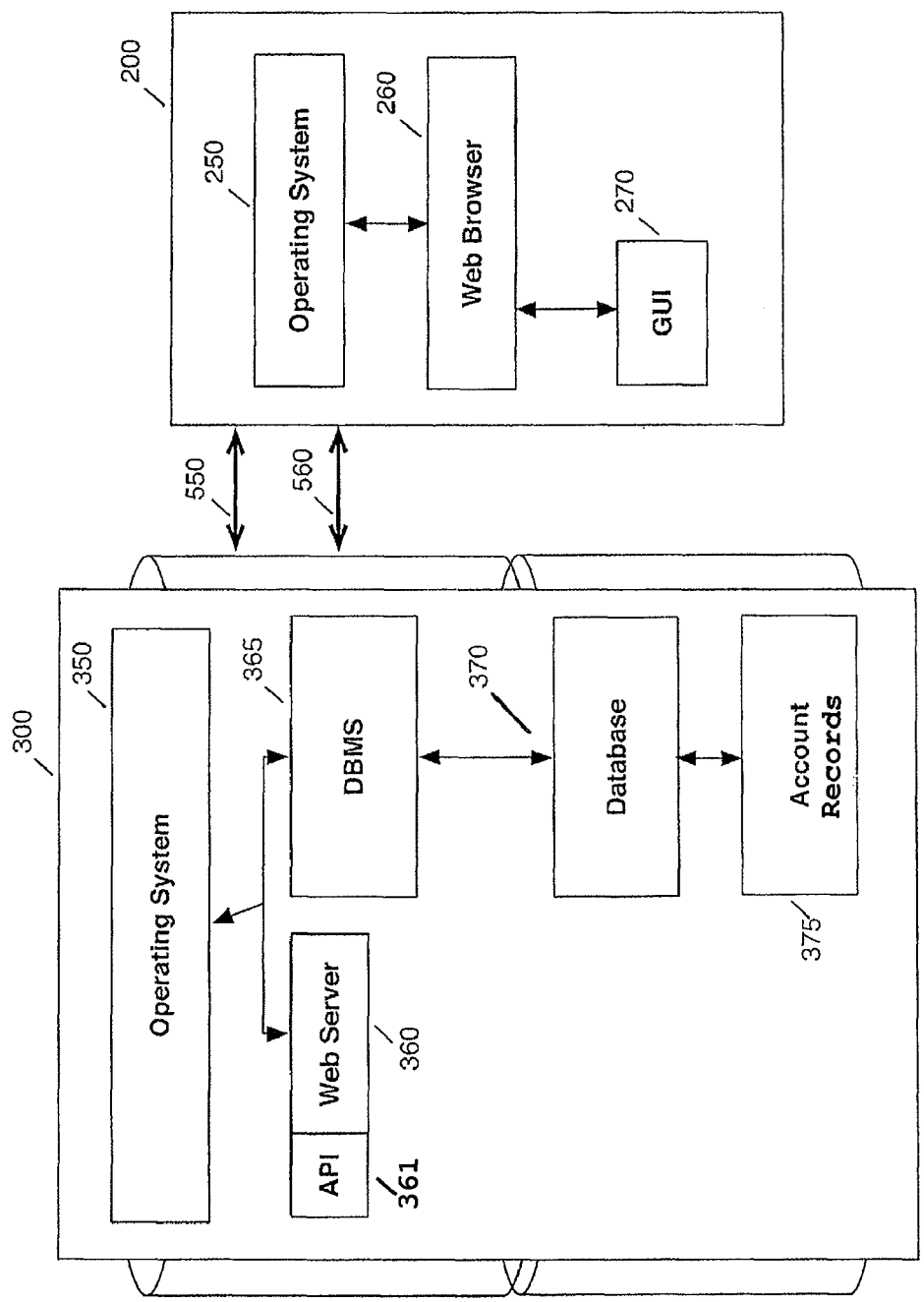
FIG. 5C is a block diagram illustrating electronic communication streams between a social media system and client systems in accordance with embodiments of the present inventive concepts.

FIG. 5C is a block diagram illustrating electronic communication streams between a social media system and client systems in accordance with embodiments of the present inventive concepts. The social media system 300 can communicate, transfer and receive data, with a plurality of client systems 200 through internet communication streams, such as, a Hypertext transfer protocol stream (HTTP/HTTPS) 550 or other protocol streams 560 (e.g., SSH, telnet, SMTP, SMS, MMS).

The social media system 300 can be configured to dynamically deliver or serve user-generated content, typically in the form of web-accessible content, to the plurality of client systems 200. For example, client systems 200 can display web-accessible content of MicroBlogs, such as, Twitter®, and can display web-accessible content of Social Networks, such as, Facebook®. Further, client systems 200 can display web-accessible content of other types of social media systems.

The systems and methods disclosed herein can be implemented by the client systems 200 of FIGS. 2A-2B, the social media systems 300 of FIG. 3A and the distributed social media messaging systems 400 of FIG. 3B, or equivalent systems, executing a unique set of instructions stored in system memory. As will be appreciated by those skilled in the art, a unique set of instructions can be implemented or embodied in executable code, such as, software, firmware, machine code or a combination thereof. As such, the unique set of instructions stored in system memory transform the systems into particular, special purpose systems that can operate, for example, according to the following exemplary flow diagrams. In one embodiment, unique sets of instructions correspond to the operations and methods disclosed in FIGS. 6-8.

Figure 6:
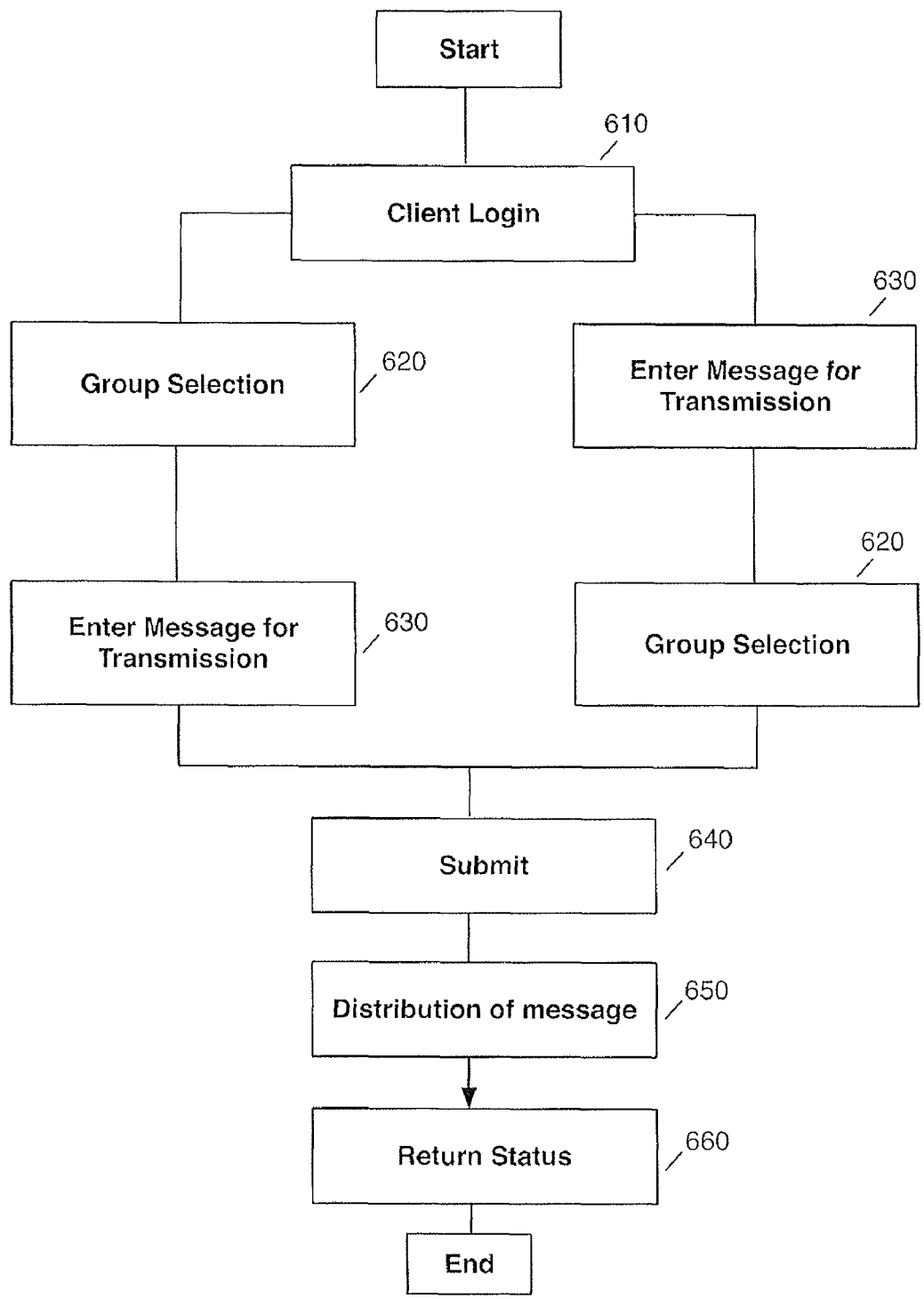
FIG. 6 is a flow diagram illustrating client interactions with a distributed social media messaging system in accordance with embodiments of the present inventive concepts.

FIG. 6 is a flow diagram illustrating client interactions with a distributed social media messaging system in accordance with embodiments of the present inventive concepts.

A client user can log into a distributed social media messaging system 400, via a client system 200, by providing a user name and corresponding password (610). In one embodiment, the distributed social media messaging system 400 hosts and serves interactive web-based content to a client system 200, in which a client user is displayed a web-based logon page (see for example FIG. 9A).

Figure 9A:
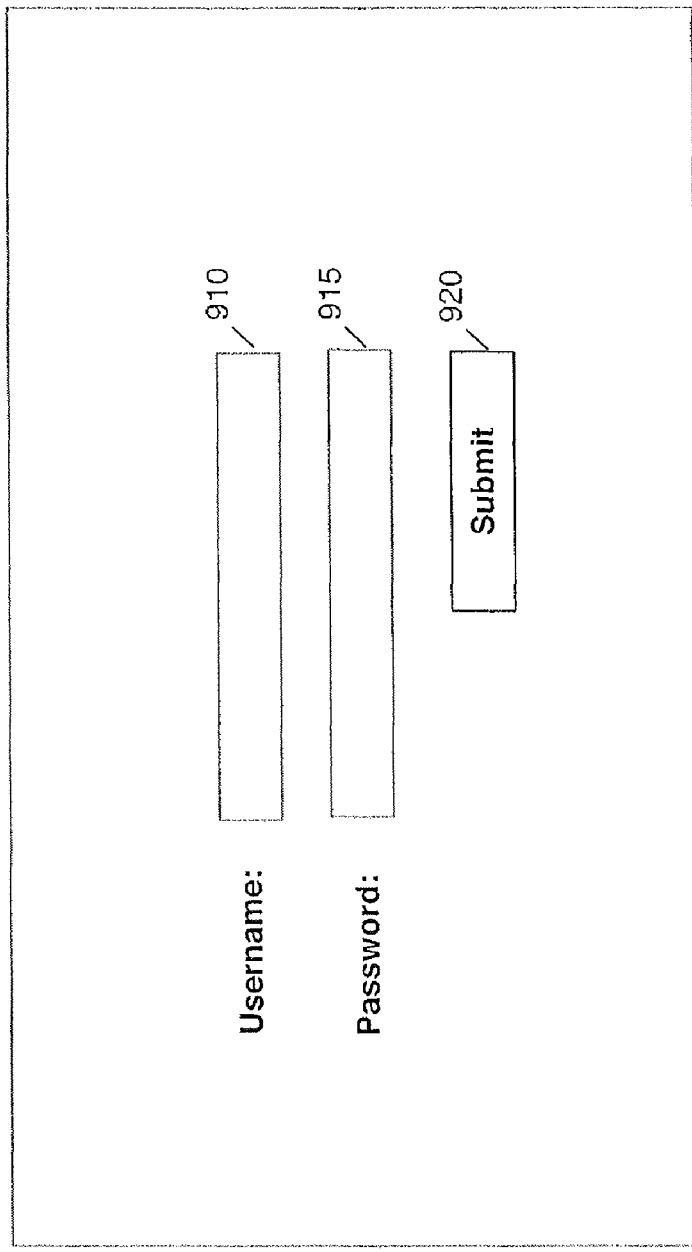
FIGS. 9A-9D illustrate client interaction with a distributed social media messaging system in accordance with embodiments of the present inventive concepts.
Figure 9B:
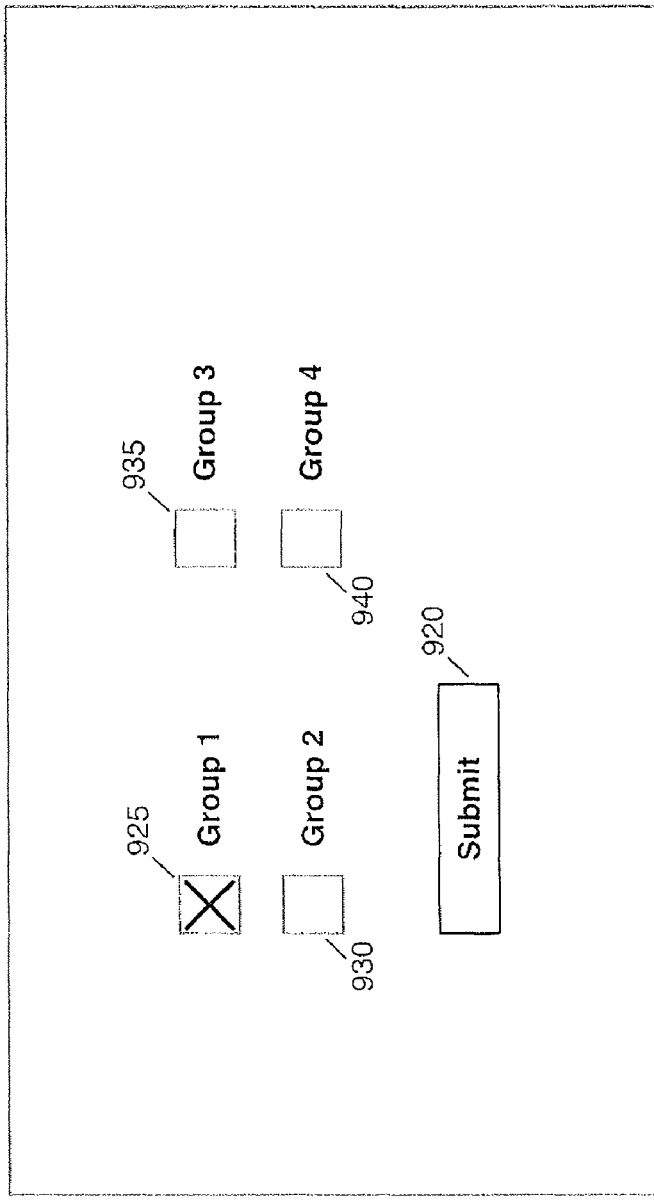

Once logged into the social media messaging system 400, the client user can choose at least one group of a plurality of groups, where each group comprises one or more social media user account credentials, through which to transmit messages (620) (see for example FIG. 9B). For example, referring to FIG. 9E, a database 475 can comprise company/franchise records 485 or other type of record table having a plurality of social media user account credentials. In this example, social media user account credentials 1, 3 and n−1 are each associated with group 1, which is illustrated as being selected in FIG. 9B. In addition, social media user account credentials 1, 3 and n−1 are illustrated, for example, as being associated with a Twitter® micro-blogging service.

Referring back to FIG. 6, before or after group selection (620), a user can enter or upload a message to the distributed social media messaging system 400 for transmittal (630). In one embodiment, the message can comprise a text string, such as, an ASCII text string or UTF-8 text string. Furthermore, the text string can comprise a URL text string or a simple alphanumeric message.

In one embodiment, a message can comprise a character-limited text string, such as, a text string limited to 140 characters or less, as required by the Twitter® micro-blogging service. For example, a text string, such as, the text string: "This is a test message . . . ", which is illustrated as a message 703 entered in text field 945 of FIG. 9C, can be entered or uploaded to the distributed social media messaging system 400 for transmittal (630). However, in other embodiments, text strings can be character limited to greater than or less than 140 characters.

In another embodiment, the message can comprise a text file, picture file, video file, audio file or combination thereof. For example, in one embodiment, the message can comprise a text string and an attachment file, similar to that of a multimedia message MMS.

A client user can submit the message to the distributed social media messaging system 400 for transmittal (640). Once submitted, the message is distributed by the distributed social media messaging system 400 to one or more social media systems 300 corresponding to each of the social media user accounts of the selected group(s) (650). In this manner, electronic messages are distributed from a client user, through one or more social media user accounts, to friends or followers of the corresponding social media user accounts by the distributed social media messaging system 400. As such, the distributed social media messaging system 400 distributes electronic content in a one-to-many-to-many type communication scheme.

Figure 9C:
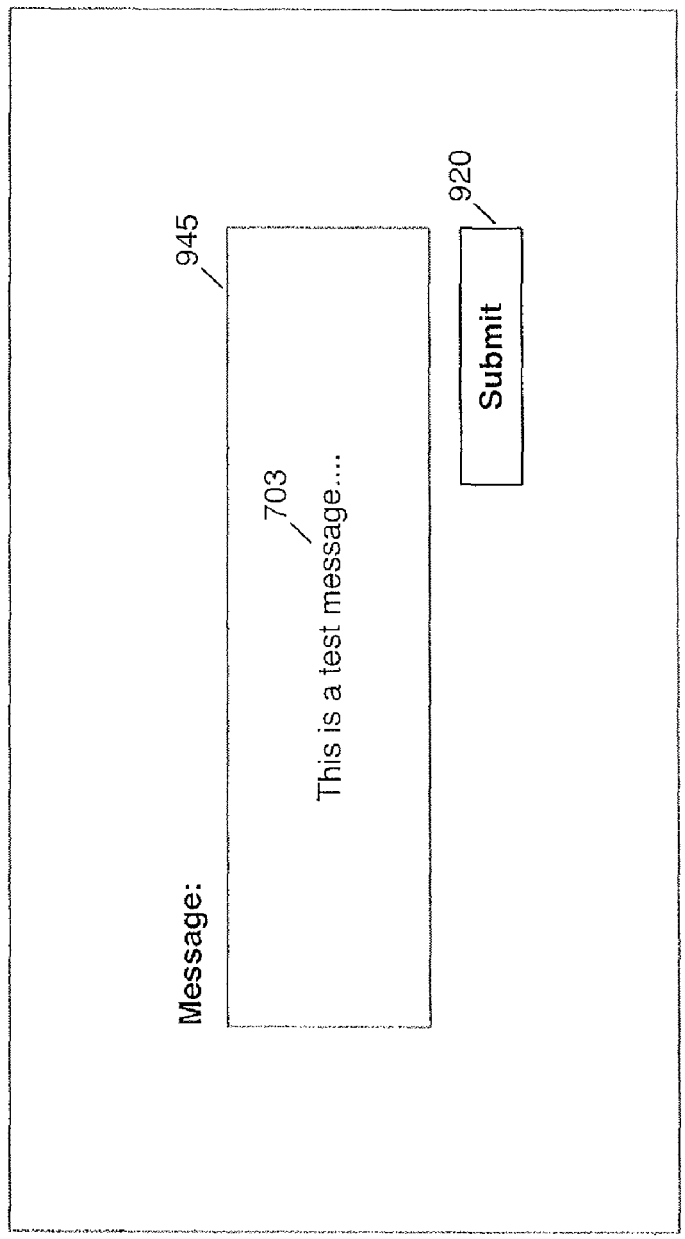
Figure 9D:
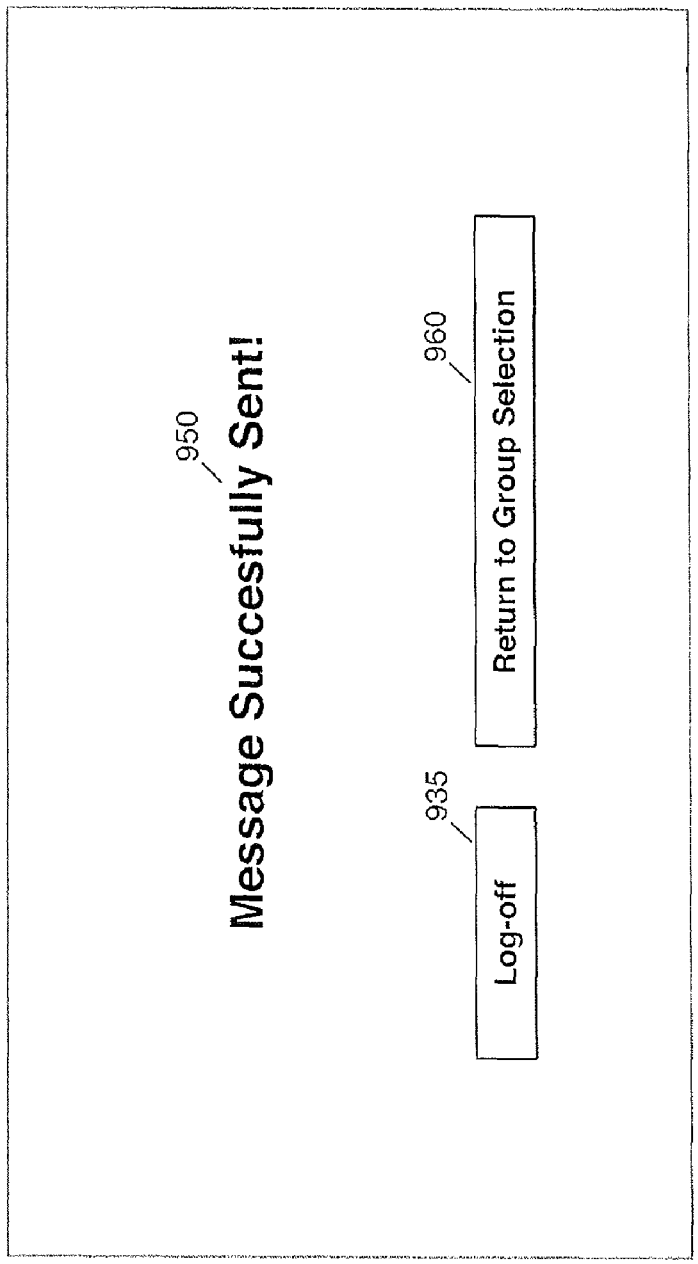

After submission of the message (640) and distribution of the message (650), the distributed social media messaging system 400 can return a transmittal status to the client user (660) (see for example FIG. 9D). The transmittal status can provide the client user status information regarding the transmission of the message(s) to the one or more social media user accounts of the selected group(s). In the event of a transmittal failure of one or more messages, the distributed social media messaging system 400 can store such failures in a transmittal failure database.

Figure 9F:
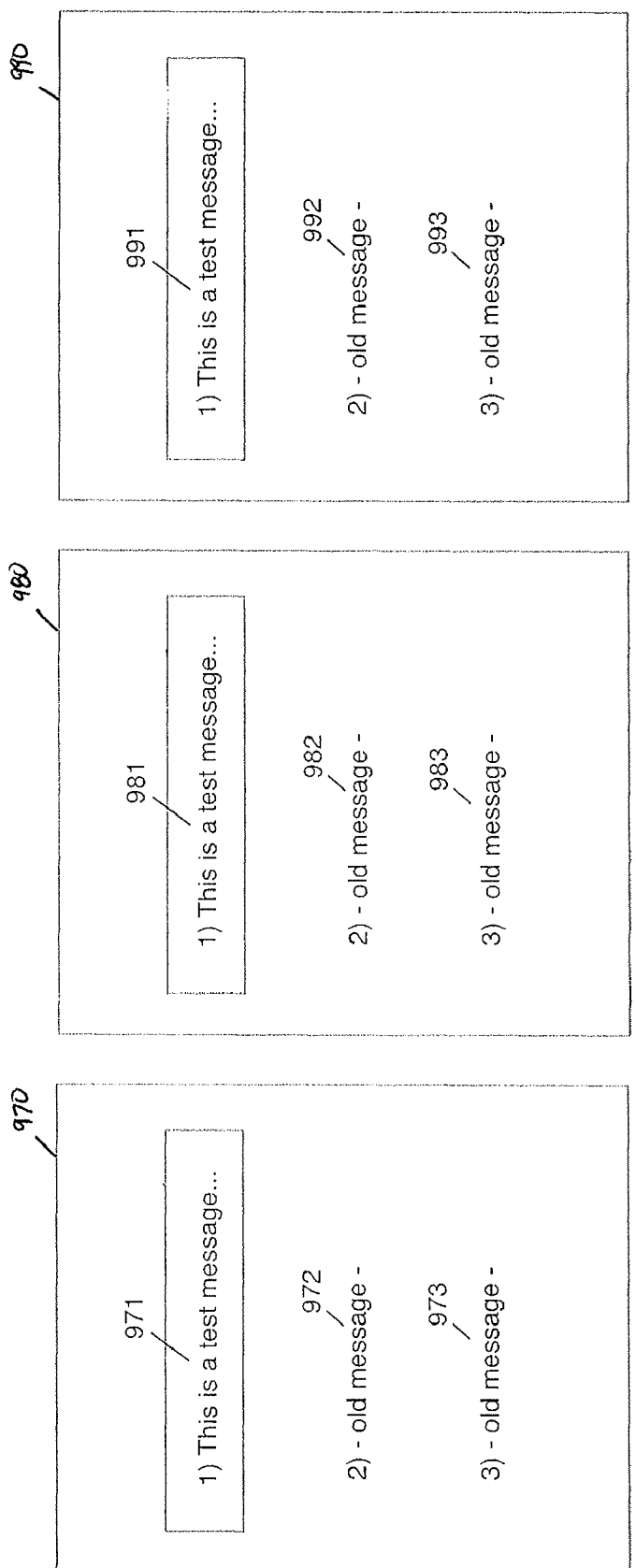
FIG. 9F illustrates an example embodiment of messages that have been published to a plurality of social media system user accounts in accordance with embodiments of the present inventive concepts.

After the successful transmission of a message, for example, the message 703 of FIG. 9C, the transmitted message is distributed to predetermined recipients of each of the social media user accounts of the selected group(s) (see for example FIG. 9F).

Referring to FIG. 9F, account profiles 970, 980, 990 are illustrative of web-based user account profiles having the message 703 displayed thereon. In this illustrative example, account profiles 970, 980, 990 are shown as being predetermined recipients of the message 703 that was distributed through the social media user accounts associated with group 1 (i.e., credentials 1, 3 and n−1).

Figure 7A:
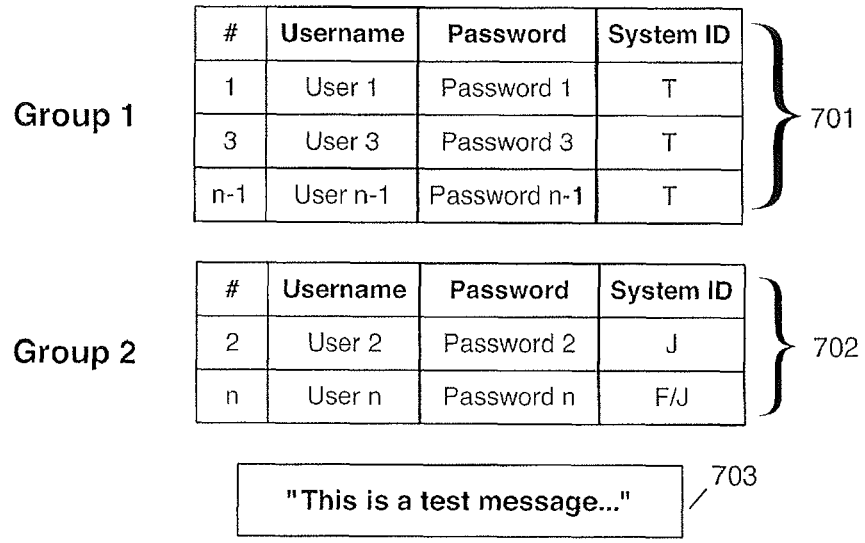
FIG. 7A illustrates first and second groups each comprising a plurality of user account credentials and a character limited message in accordance with embodiments of the present inventive concepts.

FIG. 7A illustrates first and second groups each comprising a plurality of user account credentials and a character limited message.

Each group 701, 702 can comprise one or more social media user account credentials having a username and corresponding password or a token, such as, an OAuth token, and a social media system identifier. The social media system identifier can associate the user name and corresponding password or token with a specific social media system 300 having a corresponding user account. In one embodiment, the first and second groups 701, 702 of social media user account credentials are stored in a database 475, and, in some embodiments, can be further stored in company/franchise records 485 (see FIGS. 5A and 5B).

In this illustrative example, the first group 701 comprises a first set of user credentials 1, a third set of user credentials 3 and a $n^{th}-1$ set of user credentials n−1, and the second group 702 comprises a second set of user credentials 2 and a $n^{th}$ set of user credentials n. In this example, the user credentials associated with the first and second groups 701, 702 are predetermined, and based on user account credentials stored in a database record table (see for example the database record table of FIG. 9E).

Message 703 is illustrative of a character-limited message comprising the characters: "This is a test message . . . ".

Figure 7B:
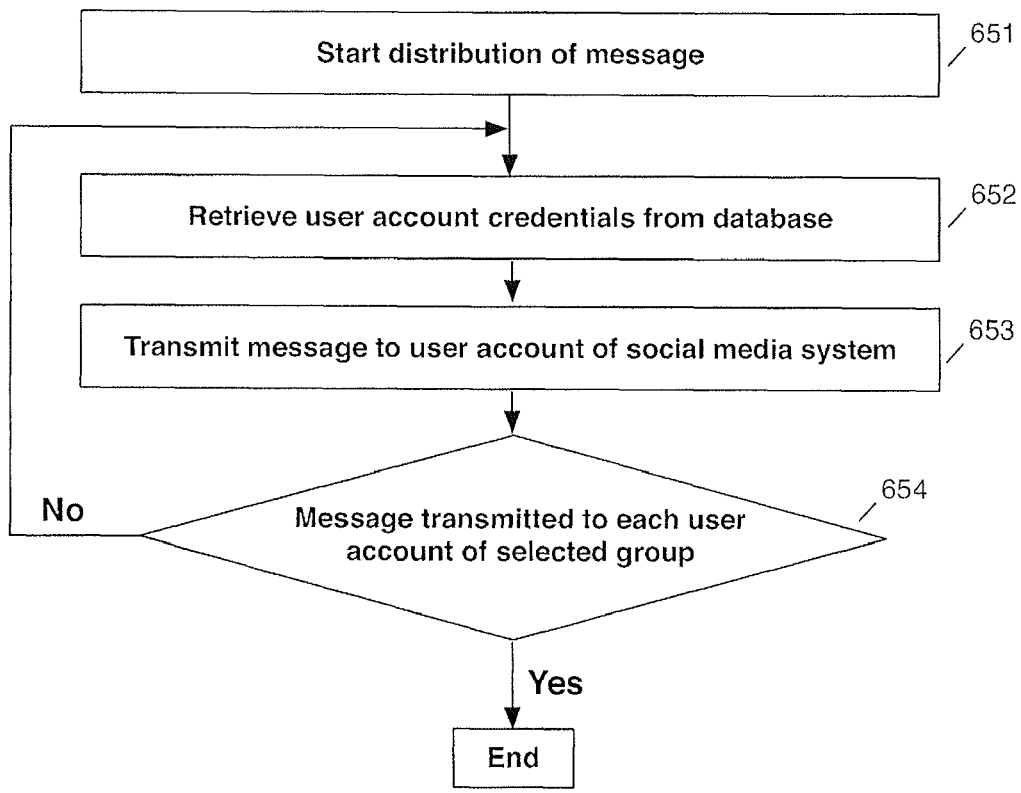
FIGS. 7B and 8 are flow diagrams illustrating a method for transmission of messages from a distributed social media messaging system to a social media system in accordance with embodiments of the present inventive concepts.
Figure 8:
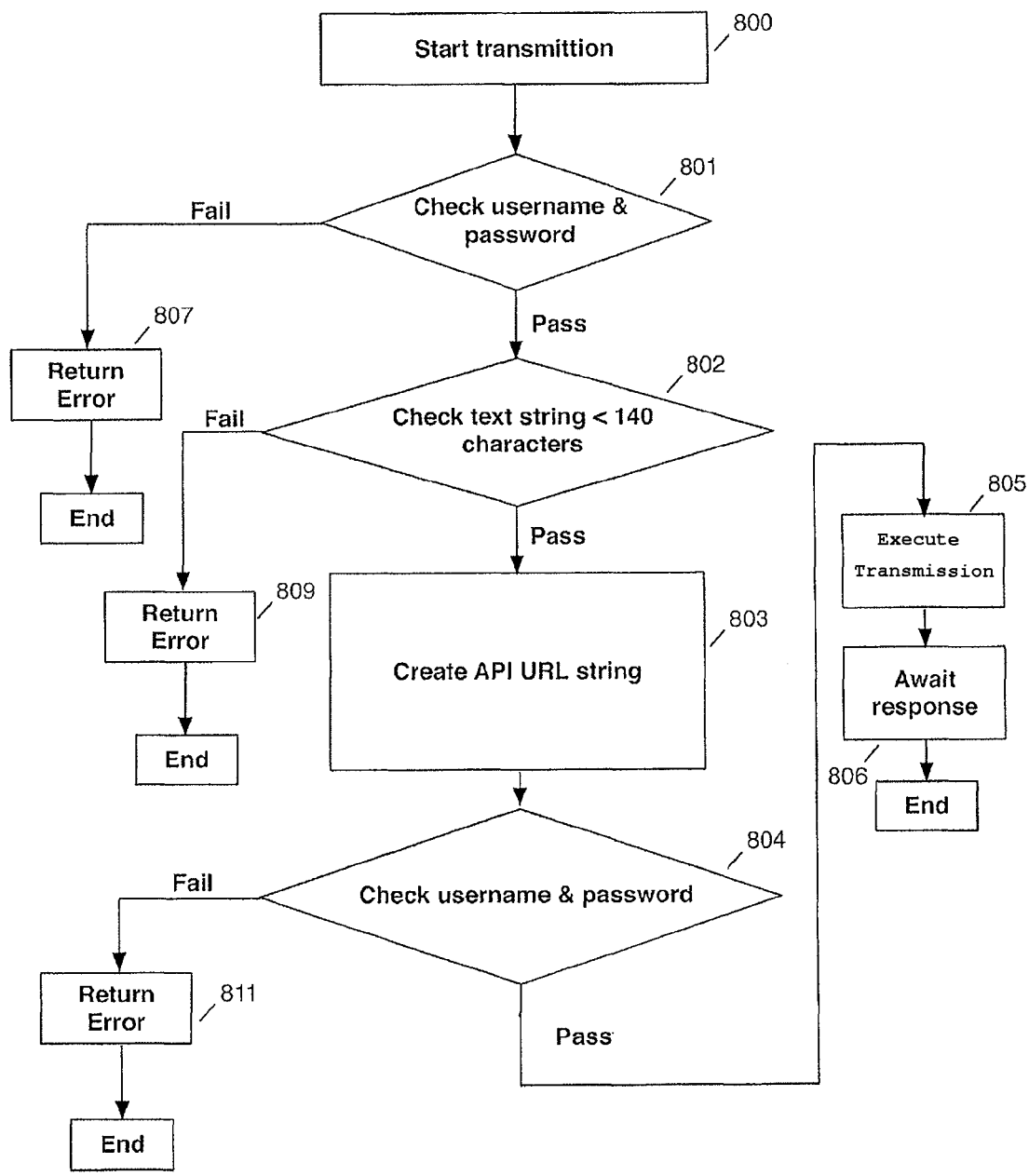

FIGS. 7B and 8 are flow diagrams illustrating a method for transmission of messages from a distributed social media messaging system to a social media system in accordance with embodiments of the present inventive concepts.

Referring to FIG. 7B, when the distributed social media messaging system 400 receives client user instructions (e.g., group selection (620), message for distribution (630), and submission (640)), the distributed social media messaging system 400 begins to distribute the message(s) (651), for example, the message 703 of FIG. 7A, to each of the social media user accounts of the selected group(s). In this example, the distributed social media messaging system 400 is illustrated as distributing the message 703 through the social media accounts associated with the social media account credentials of the first group 701.

To commence distribution of the message 703, the distributed social media messaging system 400 retrieves the first set of social media user account credentials 1 comprising a username user1, a password password1 and a social media system identifier id T (652), and transmits the user account credentials and message (653), for example, the message 703, to the corresponding social media system 300 associated with the social media system identifier id T. In this embodiment, the first set of user account credentials 1 (user1, password1) can be associated with a specific social media system 300 by the social media system identifier T; however, in other embodiments, the user account credentials can be associated with a specific social media system 300 by the grouping 701, 702 of user account credentials. That is, the first group 701 can be associated with a first social media system and the second group 702 can be associated with a second social media system. Further, in other embodiments, the first set of user account credentials can comprise a token, such as, an OAuth token.

The distributed social media messaging system 400 continues to retrieve user account credentials (652) stored in the database 475, and transmits the user account credentials and message (653) to corresponding social media systems 300, until the message has been transmitted to each of the social media user accounts of a selected group (654).

In this example, the distributed social media system 400 retrieves the third set of social media user account credentials 3, and transmits the third user account credentials and the message 703 to the corresponding social media system 300 associated with the third social media system identifier id T.

Further, the distributed social media system 400 retrieves the $n^{th}-1$ set of social media user account credentials n−1, and transmits the $n^{th}-1$ user account credentials and the message 703 to the corresponding social media system 300 associated with the $n^{th}-1$ social media system identifier id T.

In one embodiment, the character-limited message 703 is transmitted by the distributed social media messaging system 400 to a social media messaging system 300 configured as a Twitter® micro-blogging service. In this embodiment, the message can be transmitted to the social media system 300 configured as a Twitter® micro-blogging service according to the Twitter Application Programming Interface (Twitter API) published by Twitter, Inc. of San Francisco, Calif., USA. For example, the message 703 can be packaged and sent to the Twitter® micro-blogging service as a status update by executing a cURL session with Twitter servers. That is, the message 703 can be packaged according to the Twitter REST API Method: statuses update. For example, a username, a password and a message can be packaged according the Twitter API:

curl -u user:password -d "status=This is a test message . . . "
http://api.twitter.com/1/statuses/update.xml Further, in another example, a message can be packaged according the Twitter API using an OAuth pattern of authentication. In this example, the distributed social media messaging system 400 can request an access token from the Twitter® micro-blogging service, and can further generate OAuth signatures from the received access token, which can be packaged with a message for transmission to the Twitter® micro-blogging service.

Further, a message, such as, the message 703 comprising a text string of 140 characters or less can be transferred to one or more social media systems 300 by a distributed social media messaging system 400 according to the method illustrated at FIG. 8.

Referring to FIG. 8, a username and password corresponding to a social media user account credential is checked for voids (801). That is, the social media user account credential is checked for an empty, or void, username and password. In an embodiment where a message is limited to a text string having 140 characters or less, the text string length of the message is checked (802). An API URL string can then be created (803).

For example, a username and a password are concatenated and packaged into standard class variables of a cURL library function, for example, a CURLOPT_USERPWD variable. In another example, a token, such as, an OAuth token, can be packaged into standard class variables of a cURL library function, for example, a CURLOPT_USERPWD variable.

In addition, an API URL, for example, the twitter API URL http://api.twitter.com/1/statuses/update.xml, can be concatenated with the message 703 into an API URL string (803), and can be further packaged into standard class variables of a cURL library function, for example, a CURLOPT_URL variable.

In this example, a curl init function of a cURL library can be used to initiate a curl session.

The standard class variables, for example, the CURLOPT_USERPWD variable and the CURLOPT_URL variable can be checked for voids (804), and the distributed social media messaging system 400 can subsequently execute a cURL session with the social media system 300 (805). The distributed social media messaging system 400 awaits response headers from the social media system 300 to determine the status of the transmission session (806).

If a failure occurs during any one of the processes 801, 802, 803, 804, an error code can be created and logged in an error code database (807, 809, 811). Furthermore, an error code can be displayed to client user in the event of a failure.

FIGS. 9A-9D illustrate client interactions with a distributed social media messaging system in accordance with embodiments of the present inventive concepts.

FIG. 9A illustrates a web-based logon page having a username text field 910, a password text field 915, and a submission button 920. This sample page allows a client user to enter login information, such as, a username and password, for access to the distributed social media messaging system 400.

FIG. 9B illustrates a web-based group selection page having a first group selection box 925, a second group selection box 930, a third group selection box 935, a fourth group selection box 940 and a submission button 920. The first group selection box 925 is illustrated as being selected. This sample page allows a client user to select one or more identified groups of social media accounts to which a message is to be transmitted through.

In one embodiment, a client user can mouse over or click a list group, for example "Group 1", to view user accounts associated with the identified group. Further, in some embodiments, a client user can add, delete or modify the database record table and/or credentials of user accounts stored in the database record table.

FIG. 9C illustrates a web-based messaging page having a text field 945 and a submission button 920. A message comprising the text string "This is a test message . . . " is shown entered in the text field 945. This sample page allows a client user to enter a message to be transmitted.

FIG. 9D illustrates a web-based status page having a status identifier 950, a system log-off button 955 and a return to group selection button 960. This sample page provides a status identifier 950 to a client user.

FIG. 9E illustrates an example embodiment of a database record table comprising a plurality of social media system user account credentials in accordance with embodiments of the present inventive concepts.

A distributed social media messaging system 400 can comprise a database record table comprising a plurality of social media user account records (record #'s 1, 2, 3, . . . , n−1, n). Each of the social media user account records can comprise user account credentials having a username (Username) and a password (Password), or a token, such as, an OAuth token. In addition, the user account credentials can further include a social media system identifier (System ID), a company identifier (Company ID) and a group identifier (Group ID). Any of the user account records can include one or more social media system identifiers, company identifiers and/or group identifiers.

In one embodiment, the social media system identifier (System ID) associates the corresponding user account credentials with a specific social media system 300 having a corresponding social media user account. For example, the user account credentials of records 1, 3, n−1 are associated with a Twitter® micro-blogging service, the user account credentials of record 2 is associated with a Facebook® Social Network, and the user account credentials of record n is associated with a Facebook® Social Network and a Jaiku® micro-blogging service.

FIG. 9F illustrates an example embodiment of messages that have been published to a plurality of social media system user accounts. Account profiles 970, 980, 990 are illustrative of web-based user account profiles having messages displayed thereon. In this illustrative embodiment, the account profiles 970, 980, 990 are shown as being predetermined recipients of the text string 703. The text string 703 is displayed as a recipient message 971, 981, 991. In addition, previously received messages 972, 973, 982, 983, 992, 993 are also shown.

In this embodiment, the account profiles 970, 980, 990 are friends or followers of at least one social media system user account, for example, a friend or follower of the social media user account records 1, 3 or n−1 of FIG. 9F, to which the message 703 (see FIG. 7A) was distributed through by the distributed social media messaging system 400 (see FIGS. 5A and 5B).

Figure 10:
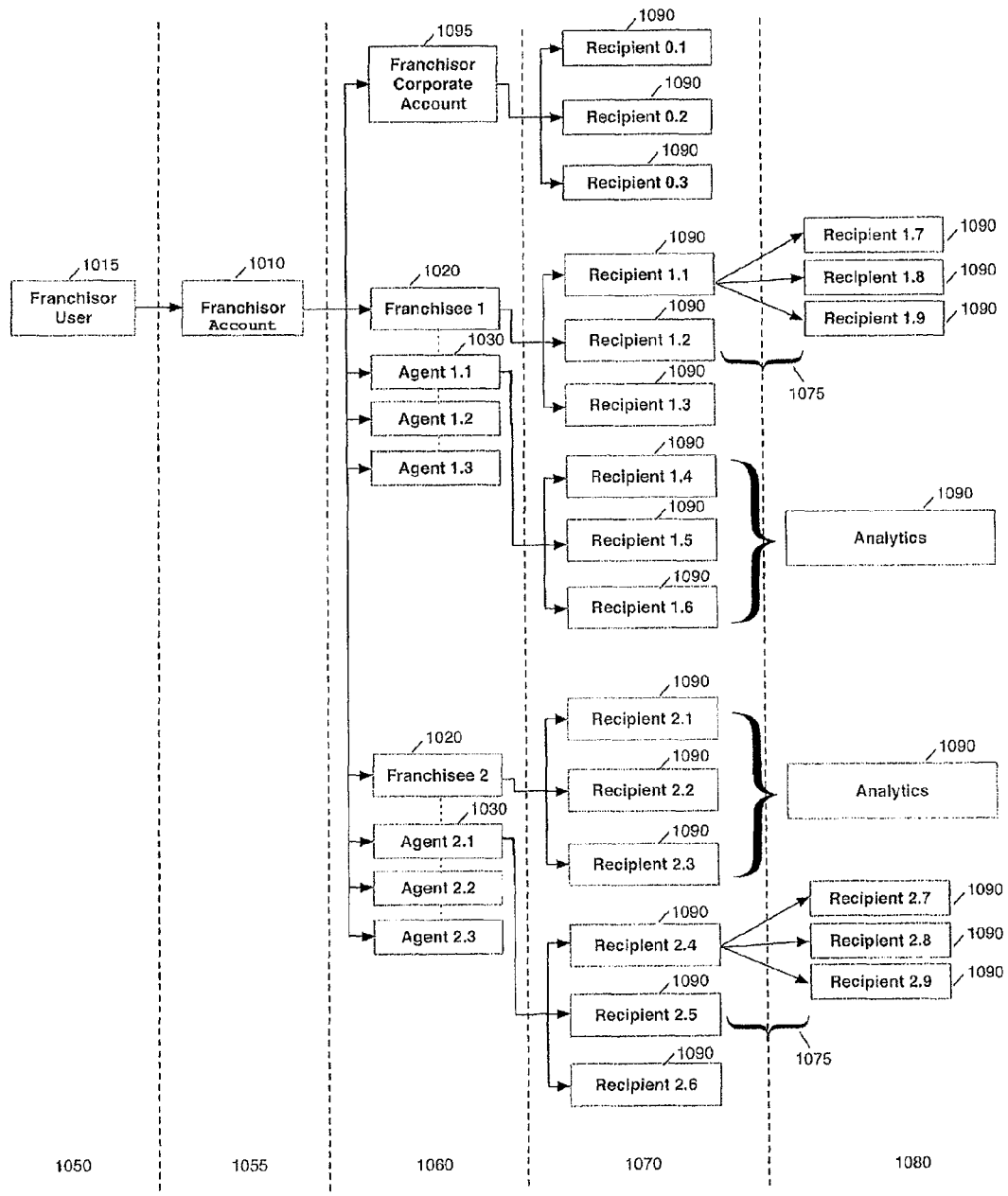
FIG. 10 illustrates an example embodiment of the distribution of electronic messages by a distributed social media messaging system configured as a multi-tiered franchise-type messaging platform accordance with embodiments of the present inventive concepts.

FIG. 10 illustrates an example embodiment of the distribution of electronic messages by a distributed social media messaging system configured as a multi-tiered franchise-type messaging platform.

A distributed social media messaging system 400 can be configured as a platform for the distribution of electronic messages through multiple social media user accounts of one or more social media systems 300. The electronic messages can be distributed through multiple tiers 1050, 1055, 1060, 1070, 1080 of a social networking environment, and can comprise text, pictures, audio and/or video. Further, the electronic content can be distributed in a one-to-many-to-many or one-to-many-to-many-to-many type communication scheme.

In one embodiment, a distributed social media messaging system 400 can be configured as a franchise-type messaging platform, which, in some embodiments, leverages a social media system 300 configured as a Twitter® micro-blogging service. In this embodiment, a distributed social media messaging system 400 is configured as a franchise-type messaging platform having one or more franchisor accounts 1010. The franchisor account 1010 of the distributed social media messaging system 400 can be accessed by one or more franchisor users 1015. Such access can be provided via a web-based user interface, for example, a web-based user interface as illustrated with respect to FIGS. 9A-9D.

The franchise-type messaging platform allows corporate franchisors and companies with multiple franchisees and/or stores each having a plurality of agents, brokers, members and/or representatives the ability to distribute or push corporate and company messages through social media accounts of its multiple franchisees and stores, as well as through social media accounts of the agents, brokers, members and/or representatives of its multiple franchisees and stores. In addition, the franchise-type messaging platform allows the franchisees, stores, agents, brokers, members and representatives control over their individual social media accounts.

For example, the franchisor account 1010 can be accessed via a client system so that franchisor users 1015 can distribute electronic messages through social media user accounts of one or more franchisees 1020, while allowing the individual franchisee user-account holders to continue to create and publish their own user-generated content. Further, the franchisor account 1010 allows franchisor users 1015 to distribute electronic messages through social media user accounts of agents 1030 of one or more franchisees 1020, while allowing individual agent user-account holders to continue to create and publish their own user-generated content. Further, the franchisor account 1010 allows franchisor users 1015 to distributed electronic messages through a corporate franchisor account 1095.

In this example, a distributed social media messaging system 400 comprises one or more databases comprising social media user account records associated with the franchisor corporate account 1095, the franchisees 1020 and agents 1030 of the franchisees 1020. In one embodiment, the social media user account records comprises one or more user credentials, which are each associated with a user account of a social media system 300 configured as a Twitter® micro-blogging service. For example, the database of social media user account records comprises user credentials of Twitter® user accounts associated with each of the franchisees 1020 and agents 1030 of the franchisees 1020 illustrated at FIG. 10. However, in other embodiments, the database of social media user account records can comprise user credentials of other social media systems, such as, Jaiku®, Plurk, Tumblr, Posterous, Yammer, FMyLife, Bebo, BigTent, Elgg, Facebook®, Geni.com, Hi5, LinkedIn®, MySpace®, Ning, Orkut, Skyrock, Qzone, Vkontakte, RenRen, Kaixin, ASmallWorld, studivz, Xing, Blogger, LiveJournal, Open Diary, TypePad, WordPress, Vox, ExpressionEngine and Xanga.

An exemplary method of distributing electronic messages will now be described with reference to FIG. 10.

A distributed social media messaging system 400 can be configured as a multi-tiered franchise-type messaging platform comprising a franchisor account 1010 having at least one database stored in system memory. The at least one database can comprise a plurality of social media user account credentials each having at least a username and a password. In other embodiments, the at least one database can comprise a plurality of social media user account credentials each having a token, such as, an OAuth Token.

The distributed social media messaging system 400 can receive a first message from a franchisor user 1015 logged into to the social media messaging system 400 via a client system 200. In one embodiment, the franchisor user 1015 can log into the social media messaging system 400 via a web-based logon page, such as, the web-based logon page illustrate at FIG. 9A. In another embodiment, the franchisor user 1015 can interact with the distributed social media messaging system 400 via Short Message Service (SMS) messages or e-mail messages.

The distributed social media messaging system 400 can further receive a group selection from the franchisor user, wherein the group selection identifies a group of social media user accounts to which the first message is to be transmitted through. In one embodiment, the franchisor user can select one or more groups via a web-based group selection page served by the distributed social media messaging system 400, such as, the web-based group selection page illustrate at FIG. 9B. For example, a first group selection can identify social media user accounts associated with "Franchisee 1" 1020 and "Agent 1.1" illustrated at FIG. 10. In another example, a second group selection can identify social media user accounts associated with "Franchisee 2" 1020 and "Agent 2.1" illustrated at FIG. 10. In yet another example, a first group and a second group can be selected; the first and second groups can identify social media user accounts associated with "Franchisee 1" 1020, "Agent 1.1" 1030, "Franchisee 2" 1020 and "Agent 2.1" 1030.

The distributed social media messaging system 400 can then retrieve user credentials of the social media user accounts associated with "Franchisee 1" 1020 and "Agent 1.1" stored in the at least one database, and package the user credentials of "Franchisee 1" 1020 and "Agent 1.1" and the first message for transmission.

The distributed social media messaging system 400 can transmit message packages to social media systems 300 having corresponding social media user accounts associated with "Franchisee 1" 1020 and "Agent 1.1", such as, a social media system 300 configured as a Twitter® micro-blogging service.

The social media system 300 automatically distributes the first message to predetermined recipients ("Recipient 1.1" through "Recipient 1.6"), friends and followers, of the social media user accounts associated with "Franchisee 1" 1020 and "Agent 1.1". As such, the platform can distribute electronic messages to recipients 1090 of franchisees 1020 and to recipients of agents 1030 of franchisees 1020. Accordingly, the platform can distribute electronic messages and leverage franchisor messaging through two tiers (e.g., 1055-->1060--->1070) of communication while still allowing individual social media account holders (e.g., "Franchisee 1" account holder, "Agent 1.1" account holder) to control, manage and/or distribute messages through their respective social media accounts.

Furthermore, the platform can distribute electronic messages and leverage franchisor messaging through three tiers (e.g., 1055-->1060-->1070-->1080) of communication. For example, in an embodiment where the social media system 300 configured as a Twitter® micro-blogging service, a predetermined recipient (e.g., Recipient 1.1) can re-transmit or "retweet" 1075 a received message to predetermined recipients (e.g., Recipient 1.7-Recipient 1.9), friends and followers, of their social media account.

While FIG. 10 is illustrative of a franchise-type messaging platform, the systems and methods described herein can be adapted to other hierarchical environments and tiered relationship models. For example, the systems and methods described herein can be adapted to one or more of the following platforms:

a company-owned retail corporation having a corporate headquarters and one or more retail stores;

a member-based organization having a member administrator and one or more clients;

a university having an administrative body and one or more colleges each having professors and alumni;

a firm having a management body and one or more offices each having members of the firm;

a sports franchise group having one or more sports franchises each having members, such as, players, coaches and administrative members;

a real estate franchise organization having a corporate headquarters having members and one or more satellite or franchisee offices each having one or more agents;

a banking or credit institution having a corporate headquarters having members and one or more branch offices having members;

a supermarket/convenience/drug store having a corporate headquarters having members and one or more retail stores and/or distribution centers having members; and a retail cooperative having a headquarters having members and one or more member retail organizations having members.

The distributed social media messaging system 400 can be further configured to include an analytic system 1090 for tracking, analyzing and optimizing messages distributed by the social media system 400. The analytic system 1090 can provide insight into key performance metrics from user Twitter accounts (parent and sub-account level), or user accounts of other social media systems, in a reporting dashboard. The analytic system 1090 can help client users and franchisor users 1015 to better understand the exposure and impact of the messages distributed by the distributed social media messaging system 400.

The analytic system 1090 can comprise a followers interface the tracks the total amount of users who 'follow' a brand's official Twitter account. The followers interface allows client users and franchisor users 1015 to can compare their user base to a competitor's user base, and investigate daily, weekly, and monthly trends in the total number of users who follow each brand's account. In addition, the followers interface allows client users and franchisor users 1015 to track the total amount of times official messages distributed by the distributed social media messaging system 400 have been retweeted across the entire Twitter network, or other social media systems.

The analytic system 1090 can further comprise a mentions interface that tracks the total number of instances that a brands keywords or a competitor's brand keywords appear across the Twitter network, or other social media system. For example, a client user or franchisor user 1015 can analyze the immediate response of messages distributed by the distribute social media messaging system 400, and can allow the client user or franchisor user 1015 to formulate a messaging strategy that prompts followers and recipients to 'tweet' about the brand with increased frequency. This can be a valuable metric for gauging the buzz surrounding a brand, which can allow a client user or franchisor user 1015 to compare 'mention' trending over the course of a single day, week, or month.

The analytic system 1090 can further comprise a market share interface that can measure the total amount of Twitter account followers of a franchise, corporation, or other entity as compared to the total number of followers of a competitor. The market share metric can be an indispensible tool for determining positioning versus a core group of competitive brands. In addition, the total percentage of the brand's market share is a useful way to determine whether the messaging impact is maximized with tweets.

The analytic system 1090 can further comprise a share of voice interface the can parse the Twitter network, or other social media system, for brand keywords, and can further aggregate that total number of brand keywords to determine the amount of times a brand is mentioned in comparison to a primary competitor. The percentage of share of voice can be directly attributed to the brand mentions of a brand. An analysis into share of voice trending can give client users and franchisor users 1015 insight into the source of brand mentions. This can be particularly valuable for determining if your brand's official tweets, open-web initiatives, or off-line promotions have an effect on the competition.

The analytic system 1090 can further comprise a clicks metric that can track the total amount of user clicks on any links within the brand's distributed messages or tweets. For example, the clicks metric can track the total amount of user clicks on any links within a message distributed by the distributed social media messaging system 400. Further, the clicks metric can provide a client user or franchisor user 1015 with a trending analysis by day, week, or month, and can help a client user or franchisor user 1015 to analyze a tweeting or messaging strategy to determine which types messages and links generate the most interest.

The analytic system 1090 can further comprise a sentiment metric that can track the total amount of positive and negative mentions of a brand, including a percentage breakdown of an overall sentiment of the brand. Sentiment can be determined by parsing the Twitter network for mentions of a brand's keywords when used in conjunction with a keyword set of positive and negative terms. The sentiment metric can be an invaluable metric for determining whether marketing initiatives, both on and off Twitter, are having an impact on a brand's target audience. A trending analysis of the sentiment metric can help client users and franchisor users 1015 tie positive and negative mentions to specific events, promotions, or press coverage.

The analytic system 1090 can further comprise a traffic metric that can measure the total amount of user clicks to the brand's website from links within messages distributed by the distributed social media messaging system 400. This metric can provide client users and franchisor users 1015 with a view of whether followers are interested enough in distributed messages to find out more about the brand on the corporate website.

The analytic system 1090 can further comprise a timeline interface that can provide an in-depth look at what Twitter users, or other social media system users, are saying about the brand. The timeline can include an aggregate view of all brand mentions (both positive/negative), competitor mentions, keyword mentions, and retweets. Client users and franchisor users 1015 are able to see all tweets that mention your brand's keyword, and subsequently save each tweet, direct reply to each tweet, direct message the tweeter via email, choose to follow the user, view the user's Twitter page, or email the tweet to another user. An analysis of the timeline can provide a history of mentions from each user, as well as an aggregate view of their total tweets, and any conversations/direct messages with that user. Additionally, a small snapshot of each user's Twitter account is provided, including their location, total followers/following, total updates, and a direct link to their Twitter page.

The analytic system 1090 can further comprise a search interface that allows client users and franchisor users 1015 the ability to parse the Twitter network, or other social media system, for mentions of any brand keywords and save the results of any keyword search, to view all tweets related to that search and subsequently save or direct reply to any tweet found during the search. In addition, the search interface allows client users and franchisor users 1015 the ability to direct messages to the user, follow that user, or view the user's Twitter page. The Search interface is a competitive intelligence tool that can allow a deep dive into Twitter data surrounding any keyword of keyword phrase. As a result, client users and franchisor users 1015 can understand and respond to competition's reach, as well as examine the impact that specific terms (product names, company employees, etc.) have across Twitter.

Figure 11:
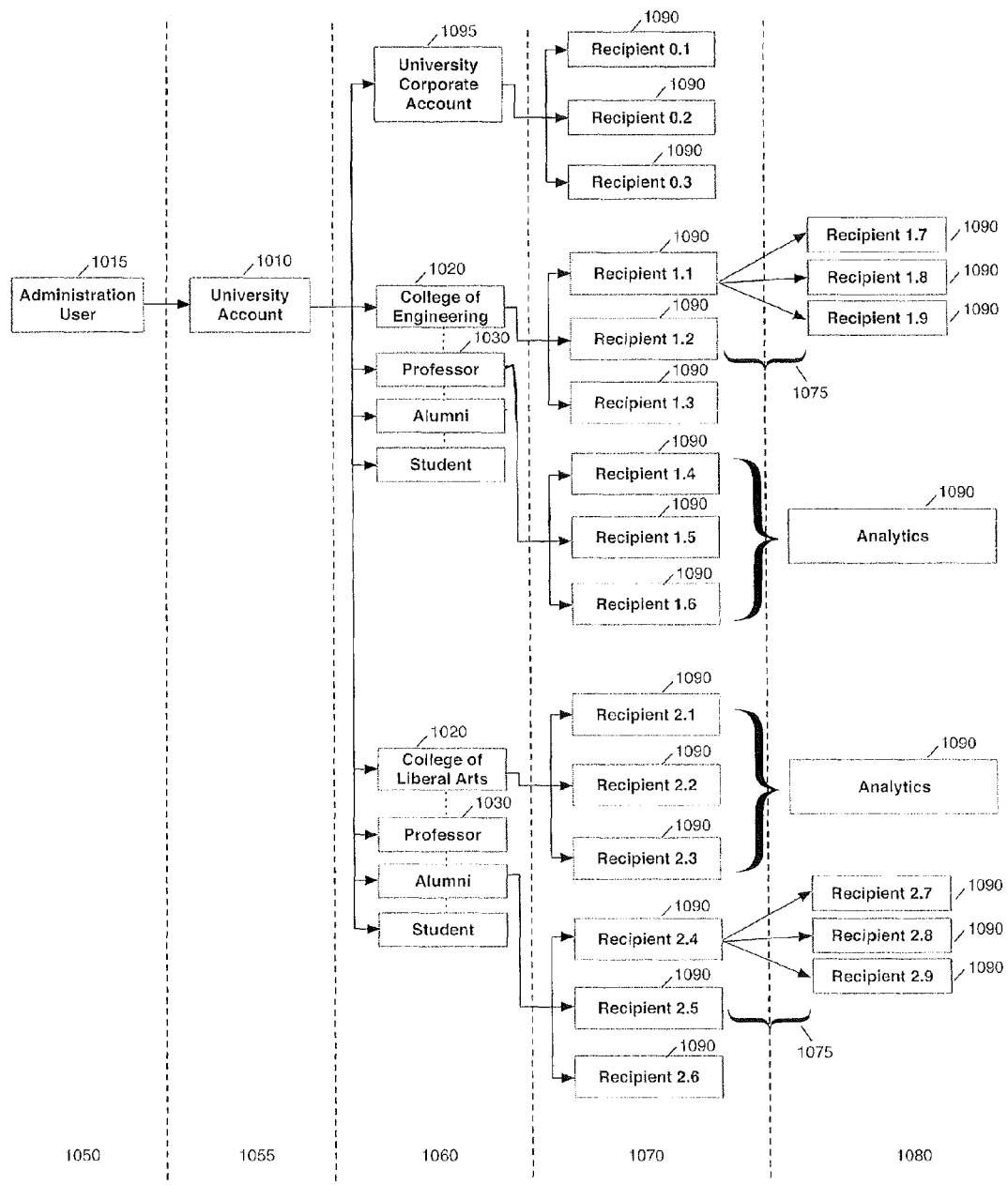
FIG. 11 illustrates an example embodiment of the distribution of electronic messages by a distributed social media messaging system configured as a multi-tiered university-type messaging platform in accordance with embodiments of the present inventive concepts.

FIG. 11 illustrates an example embodiment of the distribution of electronic messages by a distributed social media messaging system configured as a multi-tiered university-type messaging platform in accordance with embodiments of the present inventive concepts.

The distribution of messages by a distributed social media messaging system 400 configured as a multi-tiered university-type messaging platform is similar to the distribution of messages by the distributed social media messaging system 400 configured as a multi-tiered franchise-type messaging platform, and thus a detailed description will be omitted.

The university-type messaging platform allows university administrators and officials of a university with multiple colleges each having a plurality of professors, alumni and students the ability to distribute or push university messages through social media accounts of its multiple colleges, as well as through social media accounts of the professors, alumni and students of its multiple colleges. In addition, the university-type messaging platform allows the colleges, professors, alumni and students control over their individual social media accounts.

For example, the university account 1010 can be accessed via a client system so that administration users 1015 can distribute electronic messages through social media user accounts of one or more colleges 1020, while allowing the individual college user-account holders to continue to create and publish their own user-generated content. Further, the university account 1010 allows administration users 1015 to distribute electronic messages through social media user accounts of professors, alumni and students 1030 of one or more colleges 1020, while allowing individual user-account holders to continue to create and publish their own user-generated content. Further, the university account 1010 allows administration users 1015 to distributed electronic messages through a corporate university account 1095.

Figure 12:
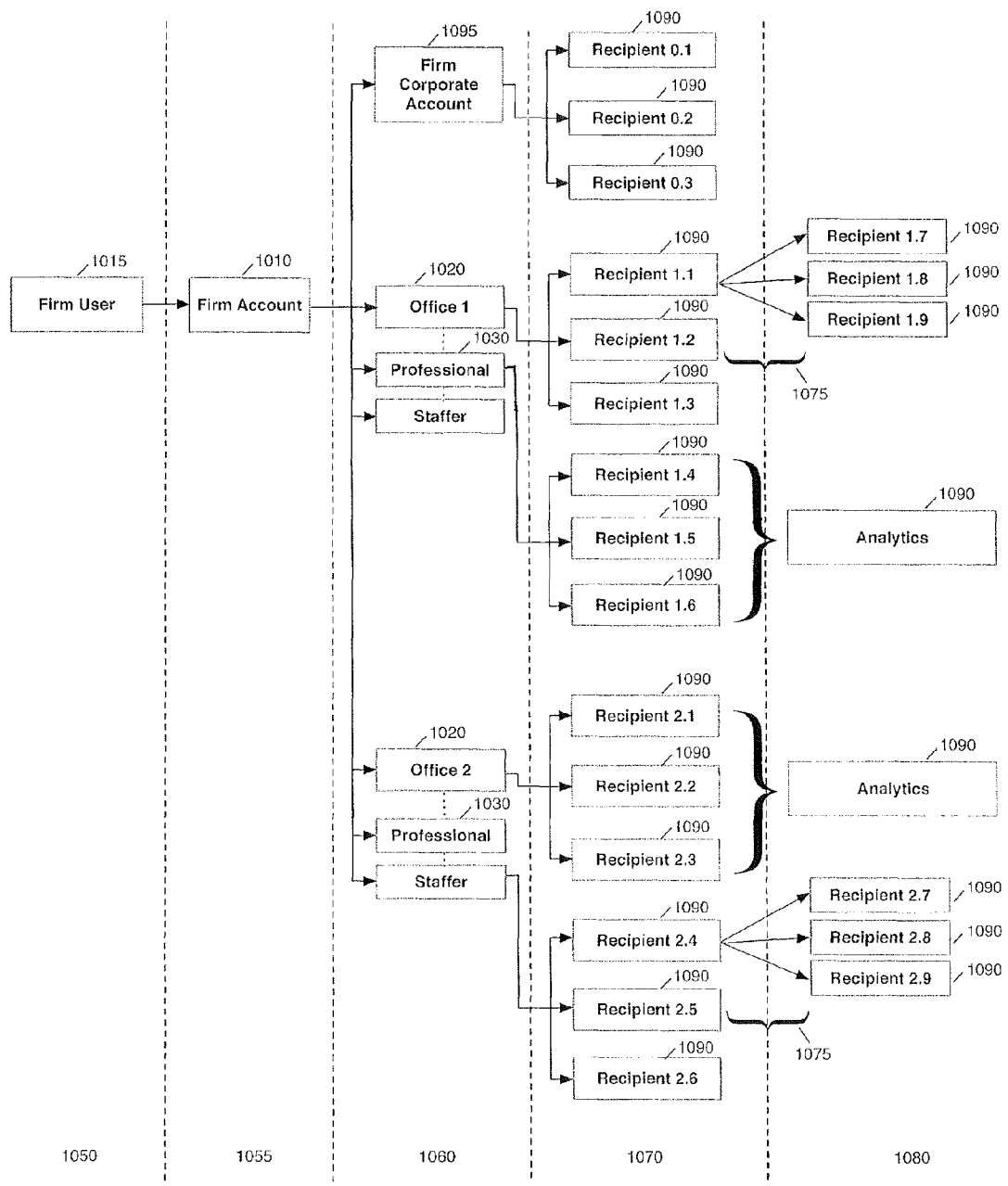
FIG. 12 illustrates an example embodiment of the distribution of electronic messages by a distributed social media messaging system configured as a multi-tiered firm-type messaging platform in accordance with embodiments of the present inventive concepts.

FIG. 12 illustrates an example embodiment of the distribution of electronic messages by a distributed social media messaging system configured as a multi-tiered firm-type messaging platform in accordance with embodiments of the present inventive concepts.

The distribution of messages by a distributed social media messaging system 400 configured as a multi-tiered firm-type messaging platform is similar to the distribution of messages by the distributed social media messaging system 400 configured as a multi-tiered franchise-type messaging platform, and thus a detailed description will be omitted.

The firm-type messaging platform allows firm administrators and officers of a firm with multiple firm offices each having a plurality of professionals and staffers the ability to distribute or push firm messages through social media accounts of its multiple firm offices, as well as through social media accounts of the professionals and staffers of its multiple firm offices. In addition, the firm-type messaging platform allows the firm offices, professionals and staffers control over their individual social media accounts.

For example, the firm account 1010 can be accessed via a client system so that firm users 1015 can distribute electronic messages through social media user accounts of one or more firm offices 1020, while allowing the individual firm office user-account holders to continue to create and publish their own user-generated content. Further, the firm account 1010 allows firm users 1015 to distribute electronic messages through social media user accounts of professionals and staffers 1030 of one or more firm offices 1020, while allowing individual user-account holders to continue to create and publish their own user-generated content. Further, the firm account 1010 allows firm users 1015 to distributed electronic messages through a corporate firm account 1095.

Figure 13:
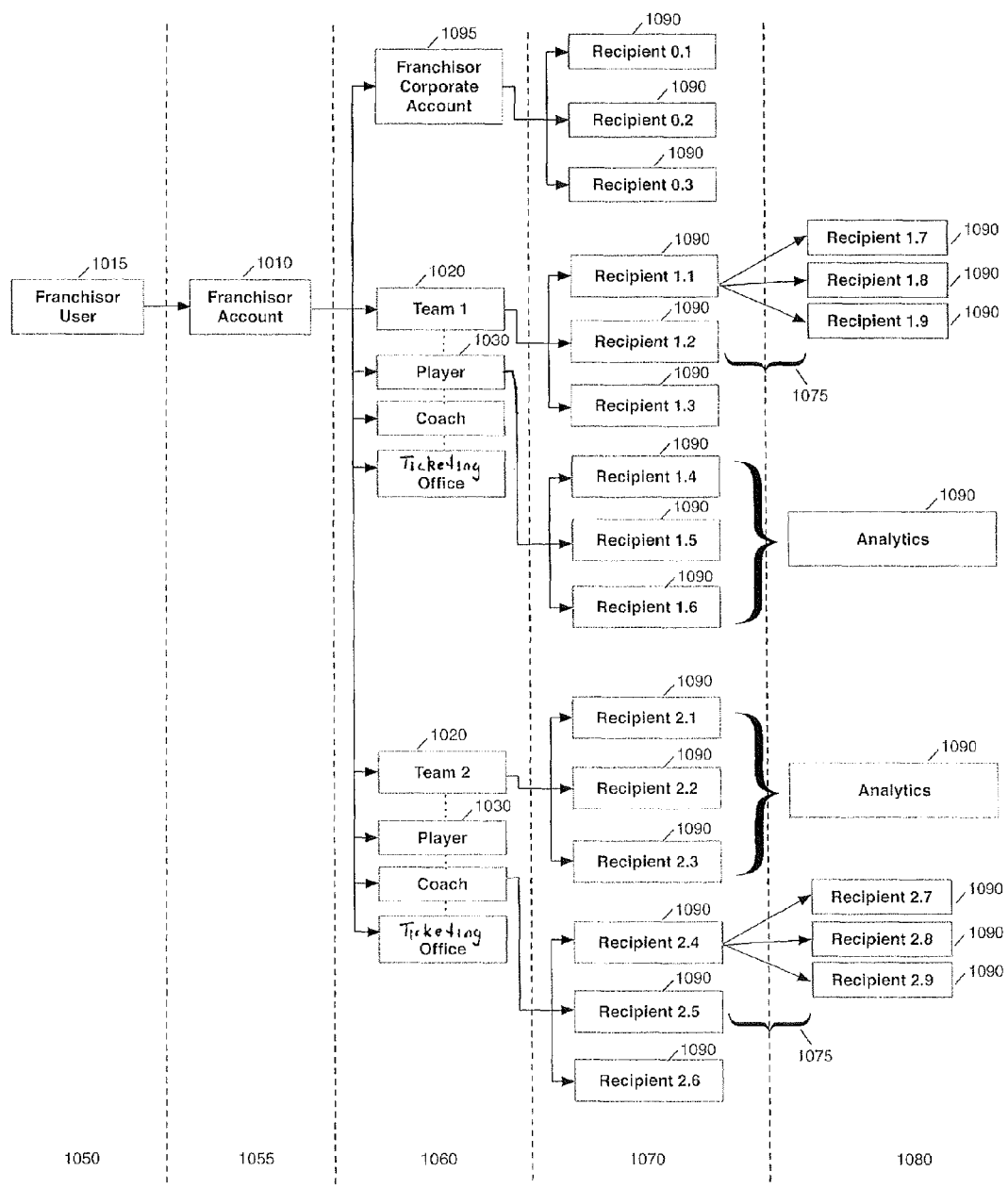
FIG. 13 illustrates an example embodiment of the distribution of electronic messages by a distributed social media messaging system configured as a multi-tiered sports franchise-type messaging platform in accordance with embodiments of the present inventive concepts.

FIG. 13 illustrates an example embodiment of the distribution of electronic messages by a distributed social media messaging system configured as a multi-tiered sports franchise-type messaging platform in accordance with embodiments of the present inventive concepts.

The distribution of messages by a distributed social media messaging system 400 configured as a multi-tiered sports franchise-type messaging platform is similar to the distribution of messages by the distributed social media messaging system 400 configured as a multi-tiered franchise-type messaging platform, and thus a detailed description will be omitted.

The sports franchise-type messaging platform allows franchisor administrators and officers of a sports league, network or franchise group with multiple franchise teams each having one or more coaches, players and ticketing offices the ability to distribute or push franchisor messages through social media accounts of its multiple franchise teams, as well as through social media accounts of the coaches, players and ticketing offices of its multiple franchise teams. In addition, the sports franchise-type messaging platform allows the franchise teams, coaches, players and ticketing offices control over their individual social media accounts.

For example, the franchisor account 1010 can be accessed via a client system so that franchisor users 1015 can distribute electronic messages through social media user accounts of one or more franchise teams 1020, while allowing the individual franchise team user-account holders to continue to create and publish their own user-generated content. Further, the franchisor account 1010 allows franchisor users 1015 to distribute electronic messages through social media user accounts of coaches, players and ticketing officers 1030 of one or more franchise teams 1020, while allowing individual user-account holders to continue to create and publish their own user-generated content. Further, the franchisor account 1010 allows franchisor users 1015 to distributed electronic messages through a corporate franchisor account 1095.

Figure 14:
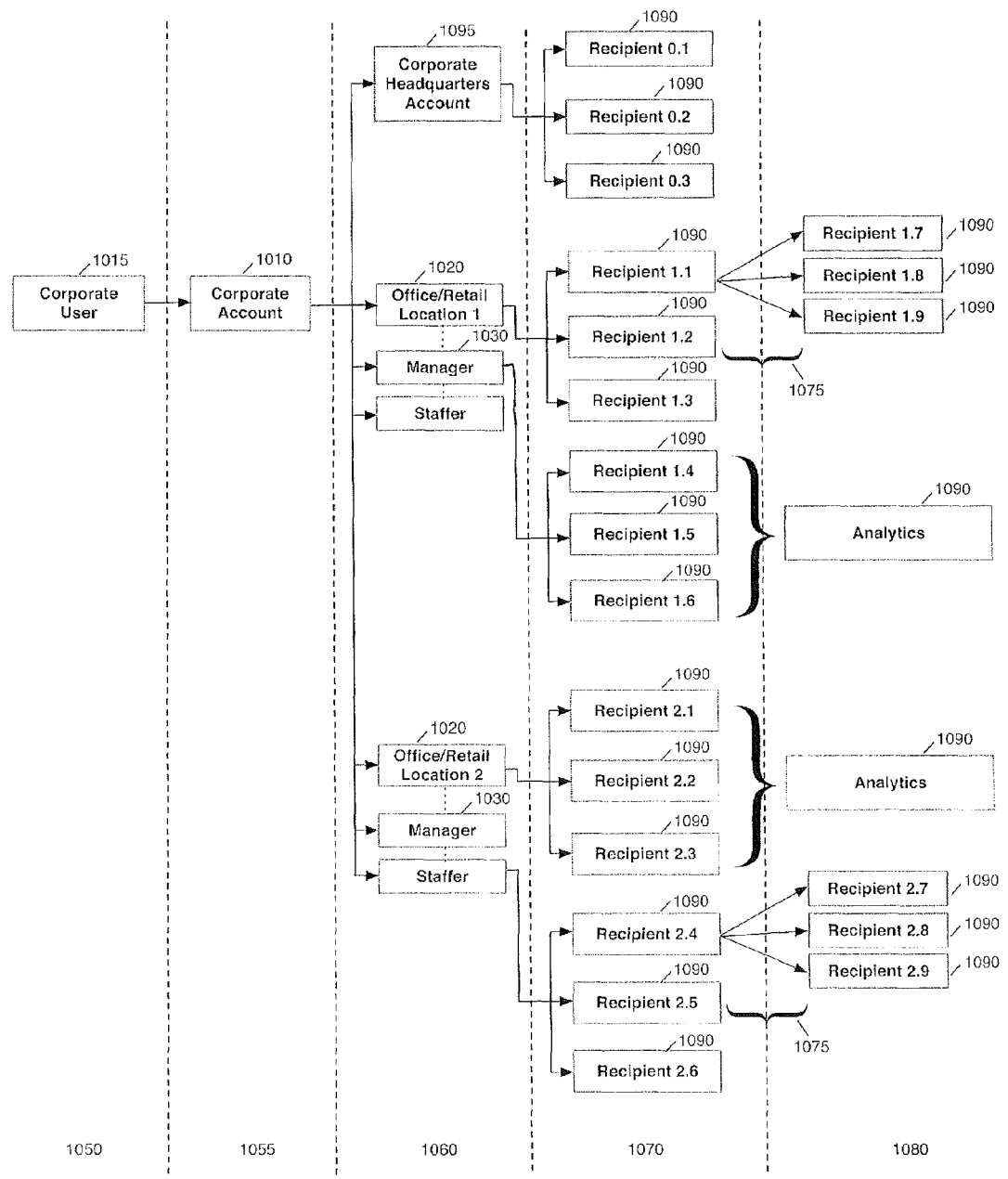
FIG. 14 illustrates an example embodiment of the distribution of electronic messages by a distributed social media messaging system configured as a multi-tiered corporate-type messaging platform in accordance with embodiments of the present inventive concepts.

FIG. 14 illustrates an example embodiment of the distribution of electronic messages by a distributed social media messaging system configured as a multi-tiered corporate-type messaging platform in accordance with embodiments of the present inventive concepts.

The distribution of messages by a distributed social media messaging system 400 configured as a multi-tiered corporate-type messaging platform is similar to the distribution of messages by the distributed social media messaging system 400 configured as a multi-tiered franchise-type messaging platform, and thus a detailed description will be omitted.

The corporate-type messaging platform allows corporate administrators and officers of a corporation or company with multiple offices or retail locations each having one or more managers and staffers the ability to distribute or push corporate messages through social media accounts of its multiple offices or retail locations, as well as through social media accounts of the managers and staffers of its multiple offices or retail locations. In addition, the corporate-type messaging platform allows the offices, retail locations, managers and staffers control over their individual social media accounts.

For example, the corporate account 1010 can be accessed via a client system so that corporate users 1015 can distribute electronic messages through social media user accounts of one or more corporate offices or retail locations 1020, while allowing the individual office or retail location user-account holders to continue to create and publish their own user-generated content. Further, the corporate account 1010 allows corporate users 1015 to distribute electronic messages through social media user accounts of managers and staffers 1030 of one or more corporate offices or retail locations 1020, while allowing individual user-account holders to continue to create and publish their own user-generated content. Further, the corporate account 1010 allows corporate users 1015 to distributed electronic messages through a corporate headquarters account 1095.

While the above examples are illustrative of a various types of messaging platforms, the systems and methods described herein can be adapted and applied to any hierarchical environments and tiered relationship models.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A method of message distribution, the method performed in a distributed social media messaging system having one or more processors accessing one or more databases comprising user account records including user credential information for one or more social media hosting systems, the one or more databases being stored in at least one storage device coupled to the one or more processors, the method comprising:
   receiving at a distributed social media messaging system a first message from a sender of a first client system comprising a web browser, a graphical user interface and an operating system, the message to be transmitted to a social media hosting system comprising account records;
   receiving at the distributed social media messaging system selection information from the sender, the selection information indicating which one or more users of the social media hosting system are to be recipients of the first message;
   the distributed messaging system retrieving a first user credential of a selected first social media user account, the first user credential comprises a first authentication token;
   the distributed social media messaging system packaging the first message and the first user credential into a first message package;
   concatenating an API URL of the first social media hosting system with the first message and storing the result of the concatenation in a first standard class variable of a cURL library function;
   storing the first authentication token in a second class variable of cURL library function; and
   the distributed social media messaging system transmitting the first message package to a first social media hosting system of which the first user is a user to activate the account of the first user to induce, the first social media hosting system to distribute the first message according to the operation of the social media hosting system to users of the social media hosting system that include predetermined recipients of the first social media user account.

2. The method of claim 1 further comprising:
   the distributed social media messaging system retrieving a second user credential of a selected second social media user account stored in the one or more databases;
   the distributed social media messaging system packaging the first message and the second user credential into a second message package; and
   the distributed social media messaging system transmitting the second message package to the first social media hosting system, of which the second user is a user, thereby activating the account of the second user to induce the first social media hosting system to distribute the first message according to the operation of the social media hosting system to users of the social media hosting system that include predetermined recipients of the second social media user account, wherein the second social media account user is a predetermined recipient of the first social media user account.

3. The method of claim 2, wherein the first social media hosting system is configured as a social media service selected from the group of social media services consisting of: Jaiku®, Plurk, Tumblr, Posterous, Yammer, FMyLife, Bebo, BigTent, Elgg, Facebook®, Geni.com, Hi5, LinkedIn®, MySpace®, Ning, Orkut, Skyrock, Qzone, Vkontakte, RenRen, Kaixin, ASmallWorld, studivz, Xing, Blogger, LiveJournal, Open Diary, TypePad, WordPress, Vox, ExpressionEngine and Xanga.

4. The method of claim 2, wherein the first social media hosting system is configured as a micro-blogging service.

5. The method of claim 4, wherein the first social media hosting system is configured as Twitter® micro-blogging service.

6. The method of claim 2 further comprising:
the distributed social media messaging system retrieving a third user credential of a selected third social media user account stored in the one or more databases;
the distributed social media messaging system packaging the first message and the third user credential into a third message package; and
the distributed social media messaging system transmitting the third message package to a second social media hosting system of which the third user is a user, thereby activating the account of the third user to induce the second social media hosting system to distribute the first message according to the operation of the social media hosting system to users of the social media hosting system that include predetermined recipients of the third social media user account, wherein the third social media account user is a predetermined recipient of the second social media user account.

7. The method of claim 6, wherein the second social media hosting system is configured as a different social media hosting service than that of the first social media hosting system.

8. The method of claim 7, wherein the second social media hosting system is configured as Jaiku® social media service.

9. The method of claim 7, wherein the second social media hosting system is configured as a social media service selected from the group of social media services consisting of: Plurk, Tumblr, Posterous, Yammer, FMyLife, Bebo, BigTent, Elgg, Facebook®, Geni.com, Hi5, LinkedIn®, MySpace®, Ning, Orkut, Skyrock, Qzone, Vkontakte, RenRen, Kaixin, ASmallWorld, studivz, Xing, Blogger, LiveJournal, Open Diary, TypePad, WordPress, Vox, ExpressionEngine and Xanga.

10. The method of claim 2, where the first user credential comprises a first username and a first password, and wherein the second user credential comprises a second username and a second password.

11. The method of claim 10, wherein packaging the first message and the first user credential further comprises:
concatenating an API URL of the first social media hosting system with the first message, the result of the concatenation being stored in a first standard class variable of a cURL library function; and
concatenating the first user name with the first password, the result of the concatenation being stored in a second class variable of cURL library function.

12. The method of claim 11, wherein transmitting the first message package further comprises executing a cURL session with the first social media hosting system.

13. The method of claim 2, wherein the first standard class variable is a CURLOPT_URL variable and wherein the second standard class variable is a CURLOPT_USERPWD variable.

14. The method of claim 2 further comprising receiving a first group selection from the sender of the first client system, the first group selection identifying a predetermined group of social media user accounts through which the first message is transmitted, wherein the first group identifies the first social media hosting system user account and the second social media hosting system user account stored in the one or more databases.

15. The method of claim 2, wherein the distributed social media messaging system is configured with a LAMP solution stack and a content management system.

16. The method of claim 15, wherein the content management system comprises an ExpressionEngine® content management system.

17. The method of claim 2 further comprising:
logging into a web-based user interface hosted by the first social media hosting system, via a distributed media messaging system from a second client system, using the first user credential; and
submitting a second message to the first social media hosting system via the distributed media messaging system from the second client system, wherein the first social media hosting system automatically distributes the second message to the predetermined recipients of the first social media hosting system user account.

18. The method of claim 17, wherein the second message consists essentially of a text string having 140 characters or less.

19. The method of claim 17, wherein the second message comprises a user-accessible text string that is limited in number of characters.

20. The method of claim 19, wherein the user-accessible text string is limited in number of characters by the second social media system.

21. The method of claim 19, wherein the user-accessible text string is limited to 140 characters or less.

22. The method of claim 1, wherein the first message comprises a user-accessible text string that is limited in number of characters.

23. The method of claim 22, wherein the user-accessible text string is limited in number of characters by the first social media hosting system.

24. The method of claim 22, wherein the user-accessible text string is limited to 140 characters or less.

25. The method of claim 1, wherein the first message consists essentially of a text string having 140 characters or less.

26. In a multi-tiered social networking environment comprising a sender, at least one distributed social media messaging system and a plurality of recipients, each recipient of the plurality of recipients being a predetermined recipient of messages from a social media hosting system, a method of distributing messages comprising:
transmitting a first message package to a social media hosting system, through a first internet communication stream and distributed social media messaging system, the social media hosting system automatically distributing a first message of the first message package to each predetermined recipient of a first user account of the social media hosting system comprising account records;
executing a cURL session with a first social media hosting system having the first account;
transmitting a second message package to the social media hosting system, through a second internet communication stream and the distributed social media messaging system to the social media hosting system, the social media hosting system automatically distributing a second message of the second message package to each predetermined recipient of a second user account of the social media hosting system, the second user account is a predetermined recipient of the first user account;

receiving a client message from a client system comprising a web browser, a graphical user interface and an operating system;

executing a cURL session with the first social media hosting system having the second user account;

packaging the client message received from the client system and the user credentials of the first user account into the first message package, the first message of the first message package corresponds to the client message from the client system; and packaging the client message received from the client system and the user credentials of the second user account into the second message package, the second message of the second message package corresponds to the client message from the client system.

27. The method of claim 26 wherein:
the first message of the first message package consists essentially of a text string having 140 characters or less, and
the second message of the second message package consists essentially of a text string having 140 characters of less.

28. The method of claim 26 wherein the text string of the first message and the text string of the second message are the same.

29. The method of claim 26 wherein:
the first message package further comprises user credentials of the first user account, and
the second message package further comprises user credentials of the second user account.

* * * * *